United States Patent
Lee et al.

(10) Patent No.: US 9,982,927 B2
(45) Date of Patent: May 29, 2018

(54) REFRIGERATOR AND METHOD OF CONTROLLING THE SAME

(71) Applicant: LG ELECTRONICS INC., Seoul (KR)

(72) Inventors: Sangbong Lee, Seoul (KR); Jangseok Lee, Seoul (KR); Hyoungkeun Lim, Seoul (KR); Myungjin Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 476 days.

(21) Appl. No.: 14/531,431

(22) Filed: Nov. 3, 2014

(65) Prior Publication Data

US 2015/0121919 A1    May 7, 2015

(30) Foreign Application Priority Data

Nov. 4, 2013 (KR) .................. 10-2013-0133028
Nov. 4, 2013 (KR) .................. 10-2013-0133029

(51) Int. Cl.
*F25D 17/06* (2006.01)
*F25B 39/02* (2006.01)
(Continued)

(52) U.S. Cl.
CPC .............. *F25B 49/02* (2013.01); *F25B 1/005* (2013.01); *F25B 5/02* (2013.01); *F25D 11/00* (2013.01);
(Continued)

(58) Field of Classification Search
CPC .... F25D 11/00; F25D 11/022; F25D 2700/12; F25D 29/00; F25B 1/005; F25B 1/10;
(Continued)

(56) References Cited

U.S. PATENT DOCUMENTS 6,397,608 B1 * 6/2002 Sakuma .................. F25B 5/02
                                                62/158
7,913,500 B2 * 3/2011 Lim ...................... F25D 21/006
                                                62/131
(Continued)

FOREIGN PATENT DOCUMENTS

| CN | 1886626 | 12/2006 |
|---|---|---|
| EP | 2 530 394 A1 | 12/2012 |
| KR | 10-2010-0034080 | 4/2010 |

OTHER PUBLICATIONS

European Search Report issued in Application No. 14191503.3 dated Jun. 16, 2015.
(Continued)

*Primary Examiner* — Frantz Jules
*Assistant Examiner* — Filip Zec
(74) *Attorney, Agent, or Firm* — Ked & Associates, LLP

(57) ABSTRACT

Provided are a refrigerator and a method of controlling the refrigerator. The method includes driving a refrigerating cycle that includes a first evaporator and a second evaporator by activating a compressor and simultaneously supplying cold air to a refrigerator compartment and a freezer compartment by supplying refrigerant to the first and second evaporators according to the driving of the refrigerating cycle. The method may further include preventing the refrigerant from being introduced into the second evaporator by more than a first prescribed amount by increasing, for a first prescribed amount of time, a flow rate of the refrigerant supplied to the first evaporator; and preventing the refrigerant from being introduced into the first evaporator by more than a second prescribed amount by increasing, for a second prescribed amount of time, a flow rate of the refrigerant supplied to the second evaporator.

10 Claims, 9 Drawing Sheets

(51) Int. Cl.
  *F25B 49/02* (2006.01)
  *F25B 5/02* (2006.01)
  *F25D 11/02* (2006.01)
  *F25D 29/00* (2006.01)
  *F25B 1/00* (2006.01)
  *F25D 11/00* (2006.01)
  *F25B 1/10* (2006.01)

(52) U.S. Cl.
  CPC ............ *F25D 11/022* (2013.01); *F25D 29/00* (2013.01); *F25B 1/10* (2013.01); *F25B 2600/01* (2013.01); *F25B 2600/0251* (2013.01); *F25B 2600/2507* (2013.01); *F25D 2700/12* (2013.01); *Y02B 40/32* (2013.01)

(58) Field of Classification Search
  CPC .......... F25B 2600/01; F25B 2600/0251; F25B 2600/2507; F25B 49/02; F25B 5/02; Y02B 40/32
  USPC .......................................................... 62/525
  See application file for complete search history.

(56) References Cited

U.S. PATENT DOCUMENTS

| | | | |
|---|---|---|---|
| 8,161,763 B2* | 4/2012 | Yun | F25B 5/02 62/200 |
| 2002/0134095 A1 | 9/2002 | Temmyo et al. | |
| 2007/0151289 A1* | 7/2007 | Youn | F25B 5/00 62/527 |
| 2008/0190125 A1 | 8/2008 | Yoshioka et al. | |
| 2009/0113904 A1 | 5/2009 | Yun et al. | |
| 2009/0235677 A1 | 9/2009 | Yanagida et al. | |
| 2015/0027151 A1* | 1/2015 | Cur | F24F 1/0003 62/117 |

OTHER PUBLICATIONS

Chinese Office Action dated Jun. 3, 2016 issued in Application No. 201410613699.9.

* cited by examiner

REFRIGERATOR AND METHOD OF CONTROLLING THE SAME

CROSS-REFERENCE TO RELATED APPLICATIONS

The present application claims priority under 35 U.S.C. § 119 to Korean Patent Applications Nos. 10-2013-0133028 and 10-2013-0133029 filed on Nov. 4, 2013, whose entire disclosures are hereby incorporated by reference.

BACKGROUND

1. Field

The present disclosure relates to a refrigerator and a method of controlling the refrigerator.

2. Background

Refrigerators include a plurality of storages for storing food at a frozen state or a refrigerated state. The storages have an open side for allowing access to the food stored in the storages. The storages may include a freezer compartment for storing food in the frozen state and a refrigerator compartment for storing food in the refrigerated state.

A refrigerating system through which refrigerant circulates is driven in such a refrigerator. The refrigerating system includes a compressor, a condenser, an expansion device, and an evaporator. The evaporator may include a first evaporator disposed at a side of a refrigerator compartment, and a second evaporator disposed at a side of a freezer compartment.

Cold air stored in the refrigerator compartment may be cooled through the first evaporator and be then supplied again to the refrigerator compartment. Cold air stored in the freezer compartment may be cooled through the second evaporator and be then supplied again to the freezer compartment. The refrigerant may be selectively supplied to the first or second evaporator and be evaporated.

As such, typical refrigerators are configured such that a plurality of storages are independently cooled through separate evaporators, and refrigerant is supplied to any one of the evaporators to cool one of the storages and stop cooling of the other storages. Thus, simultaneous cooling of the storages is delimited, and one of the storages and the others are selectively or alternately cooled.

In this case, the storage that is cooled is maintained at an appropriate range of temperatures, but temperatures of the storages that are not cooled may increase outside a desired range. In addition, while cooling of one of the storages, it may be sensed that the temperatures of the other storages are outside the normal range. In this case, the other storages cannot be instantly cooled.

As a result, a structure for independently cooling storages cannot supply cold air to a suitable place at a suitable time, thus decreasing operation efficiency of a refrigerator.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to embodiments of the present disclosure, examples of which are illustrated in the accompanying drawings.

Figure 1:
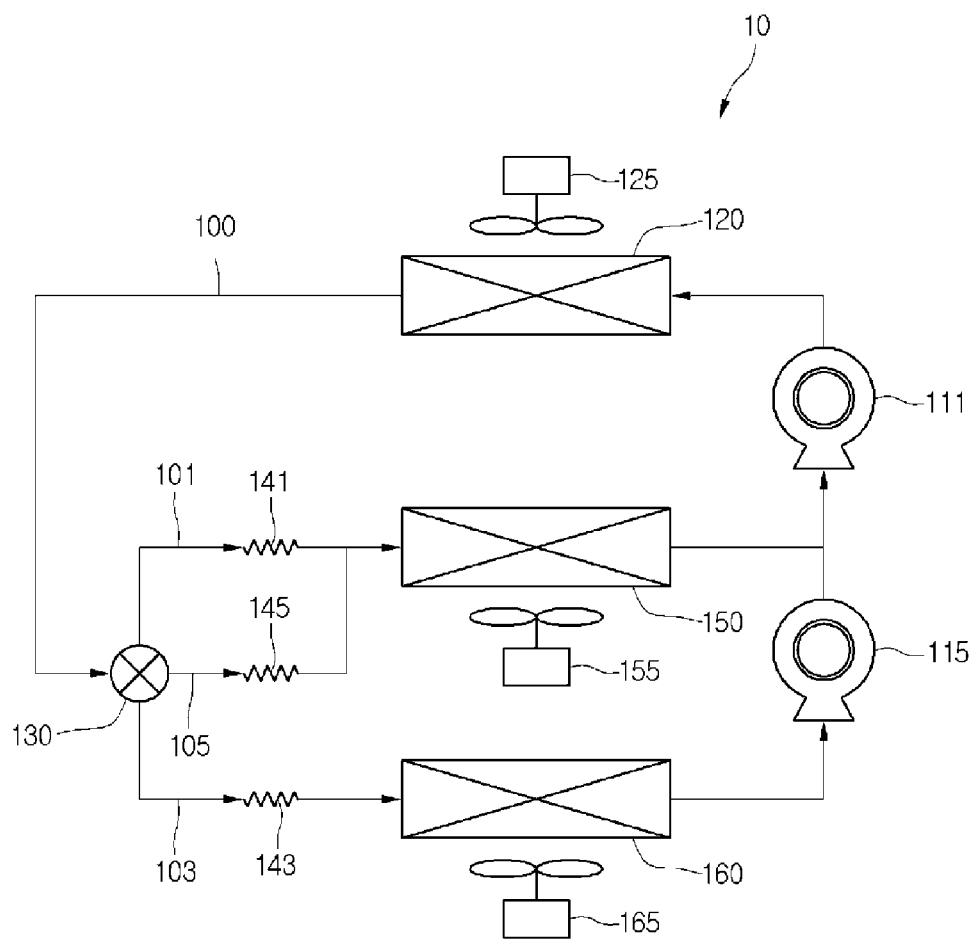
FIG. 1 is a schematic view illustrating a configuration of a refrigerating cycle of a refrigerator according to an embodiment.

FIG. 1 is a schematic view illustrating a configuration of a refrigerating cycle of a refrigerator according to an embodiment. A refrigerator 10 according to the current embodiment may include a plurality of devices for driving a refrigerating cycle. In particular, the refrigerator 10 may include a plurality of compressors 111 and 115 for compressing refrigerant, a condenser 120 for condensing the refrigerant compressed at the compressors 111 and 115, a plurality of expansion devices 141, 143, and 145 for depressurizing the refrigerant condensed at the condenser 120, and a plurality of evaporators 150 and 160 for evaporating the refrigerant depressurized at the expansion devices 141, 143, and 145.

Further, the refrigerator 10 may include a refrigerant pipe arrangement 100 that connects the compressors 111 and 115, the condenser 120, the expansion devices 141, 143, and 145, and the evaporators 150 and 160 to one another to guide flows of the refrigerant.

The compressors 111 and 115 may include a second compressor 115 disposed at a low pressure side, and a first compressor 111 for further compressing refrigerant compressed at the second compressor 115. The first compressor 111 may be connected in series to the second compressor 115. For example, a portion of the refrigerant pipe arrangement 100 disposed at an outlet side of the second compressor 115 may be connected to an inlet side of the first compressor 111.

The evaporators 150 and 160 may include a first evaporator 150 for generating cold air to be supplied to any one of a refrigerator compartment and a freezer compartment, and a second evaporator 160 for generating cold air to be supplied to the other. For example, the first evaporator 150 may generate cold air to be supplied to the refrigerator compartment and be disposed at a side of the refrigerator compartment. The second evaporator 160 may generate cold air to be supplied to the freezer compartment and be disposed at a side of the freezer compartment.

A temperature of the cold air supplied to the freezer compartment may be lower than that of the cold air supplied to the refrigerator compartment. Thus, a refrigerant evaporation pressure of the second evaporator 160 may be lower than that of the first evaporator 150.

A portion of the refrigerant pipe arrangement 100 disposed at an outlet side of the second evaporator 160 may extend to an inlet side of the second compressor 115. Thus, the refrigerant passed through the second evaporator 160 may be introduced into the second compressor 115.

A portion of the refrigerant pipe arrangement 100 disposed at an outlet side of the first evaporator 150 may be connected to the portion of the refrigerant pipe arrangement 100 disposed at the outlet side of the second compressor 115. Thus, the refrigerant passed through the first evaporator 150 may join the refrigerant compressed at the second compressor 115 and be introduced into the first compressor 111.

The expansion devices 141, 143, and 145 may include first and third expansion devices 141 and 145 for expanding the refrigerant to be introduced into the first evaporator 150, and a second expansion device 143 for expanding the refrigerant to be introduced into the second evaporator 160. The first to third expansion devices 141, 143, and 145 may include capillary tubes.

The second evaporator 160 may be used as an evaporator for the freezer compartment, and the first evaporator 150 may be used as an evaporator for the refrigerator compartment. In this case, a diameter of the capillary tube of the second expansion device 143 may be smaller than diameters of the capillary tubes of the first and third expansion devices 141 and 145 such that the refrigerant evaporation pressure of the second evaporator 160 is lower than that of the first evaporator 150.

Refrigerant passages 101 and 105 may be disposed at an inlet side of the first evaporator 150 to guide the refrigerant to be introduced into the first evaporator 150. The refrigerant passages 101 and 105 may include a first refrigerant passage 101 on which the first expansion device 141 is installed, and a third refrigerant passage 105 on which the third expansion device 145 is installed. The first and third refrigerant passages 101 and 105 may guide the refrigerant to be introduced into the first evaporator 150 and may be thus referred to as "first evaporation passages". The refrigerant flowing through the first refrigerant passage 101 and the refrigerant flowing through the third refrigerant passage 105 may join each other and be then introduced into the first evaporator 150.

A refrigerant passage 103 may be disposed at an inlet side of the second evaporator 160 to guide the refrigerant to be introduced into the second evaporator 160. The refrigerant passage 103 may include a second refrigerant passage 103 on which the second expansion device 143 is installed. The second refrigerant passage 103 may guide the refrigerant to be introduced into the second evaporator 160 and may be thus referred to as "a second evaporation passage".

The first to third refrigerant passages 101, 103, and 105 may be understood as "branch passages" diverging from the refrigerant pipe arrangement 100.

The refrigerator 10 may include a flow adjusting part 130 that divides the refrigerant to be introduced into the first to third refrigerant passages 101, 103, and 105. The flow adjusting part 130 may be understood as a device for adjusting flows of the refrigerant such that at least one of the first and second evaporators 150 and 160 is operated, for example, such that the refrigerant is introduced into any one of the first and second evaporators 150 and 160 or both the first and second evaporators 150 and 160.

The flow adjusting part 130 may include a four-way valve, which includes an inflow part through which the refrigerant is introduced, and three outflow parts through which the refrigerant is discharged. The first to third refrigerant passages 101, 103, and 105 may be connected to the three outflow parts of the flow adjusting part 130, respectively. Thus, the refrigerant passing through the flow adjusting part 130 may be divided and discharged to the first to third refrigerant passages 101, 103, and 105. The outflow parts connected to the first to third refrigerant passages 101, 103, and 105 may be referred to as "a first outflow part", "a second outflow part", and "a third outflow part", respectively.

At least one of the first to third outflow parts may be opened. For example, when the first to third outflow parts are opened, the refrigerant may flow through the first to third refrigerant passages 101, 103, and 105. When the first and second outflow parts are opened, and the third outflow part is closed, the refrigerant may flow through the first and second refrigerant passages 101 and 103.

The first outflow part may be opened, and the second and third outflow parts may be closed, so that the refrigerant can flow through only the first refrigerant passage 101. The second outflow part may be opened, and the first and third outflow parts may be closed, so that the refrigerant can flow through only the second refrigerant passage 103.

According to such control of the flow adjusting part 130, a flow path of the refrigerant may be changed. The flow adjusting part 130 may be controlled based on whether the refrigerant is insufficient or excessive in the first evaporator 150 or the second evaporator 160.

For example, when the first and second evaporators 150 and 160 are simultaneously operated, and the refrigerant is relatively insufficient in the first evaporator 150, the flow adjusting part 130 may be controlled such that the refrigerant flows through the first to third refrigerant passages 101, 103, and 105.

On the contrary, when the refrigerant is relatively insufficient in the second evaporator 160, the third refrigerant passage 105 may be closed, and the flow adjusting part 130 may be controlled such that the refrigerant flows through the first and second refrigerant passages 101 and 103.

For example, a plurality of flow paths for the refrigerant to be introduced into the first evaporator 150 may be provided as the first and third refrigerant passages 101 and 105, and flows of the refrigerant through the first and third refrigerant passages 101 and 105 may be selectively controlled, thereby adjusting an amount of the refrigerant to be introduced into the first evaporator 150 or the second evaporator 160.

Since the inlet side of the first evaporator 150 is superior to the inlet side of the second evaporator 160 in terms of number of refrigerant paths, when the first to third refrigerant passages 101, 103, and 105 are opened, a larger amount of the refrigerant may flow to the first evaporator 150 than to the second evaporator 160. For example, a heat exchange ability of the first evaporator 150 may be greater than that of the second evaporator 160. Thus, when the first evaporator 150 is an evaporator for the refrigerator compartment, and the second evaporator 160 is an evaporator for the freezer compartment, a cooling load or capacity of the refrigerator compartment may be greater than that of the freezer compartment.

The refrigerator 10 may include blower fans 125, 155, and 165 disposed at a side of a heat exchanger to blow air. The blower fans 125, 155, and 165 may include a condensing fan 125 disposed at a side of the condenser 120, a first evaporation fan 155 disposed at a side of the first evaporator 150, and a second evaporation fan 165 disposed at a side of the second evaporator 160.

The heat exchange abilities of the first and second evaporators 150 and 160 may be changed according to rotation speeds of the first and second evaporation fans 155 and 165. For example, when a large amount of cold air generated according to an operation of the first evaporator 150 is needed, the rotation speed of the first evaporation fan 155 may increase. In addition, when the cold air generated according to the operation of the first evaporator 150 is sufficient, the rotation speed of the first evaporation fan 155 may decrease.

Figure 2:
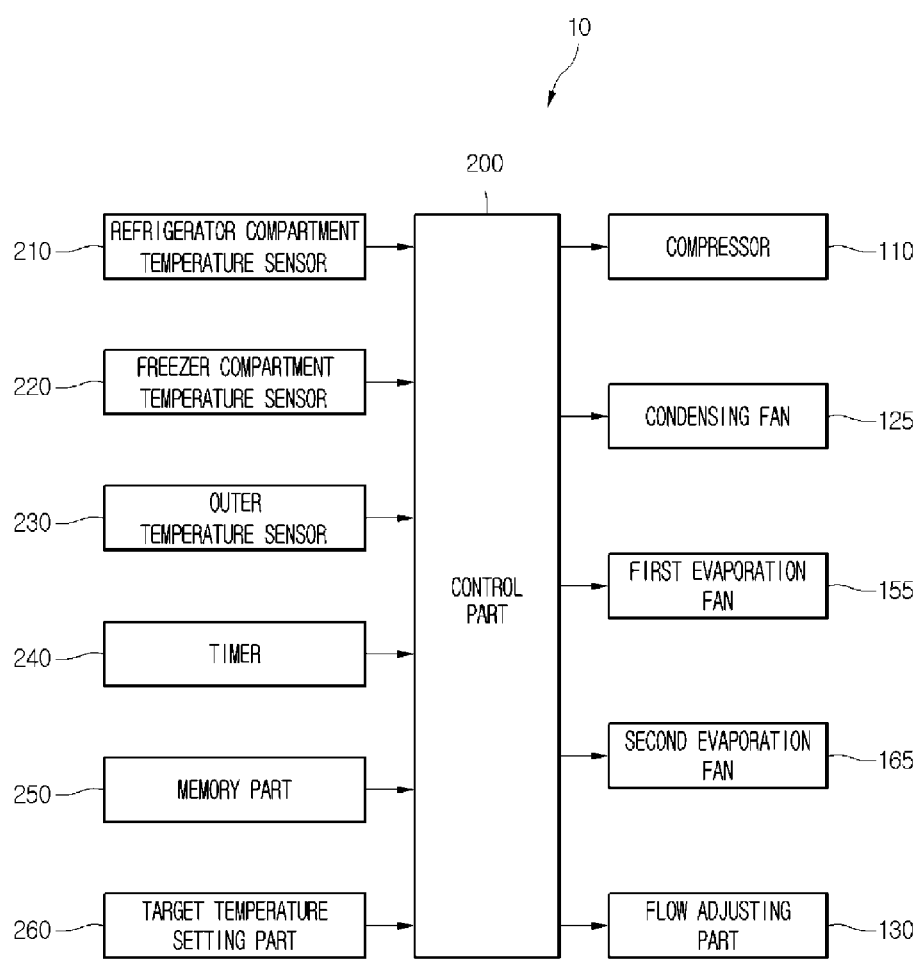
FIG. 2 is a block diagram illustrating a configuration of the refrigerator according to the embodiment of FIG. 1.
Figure 3:
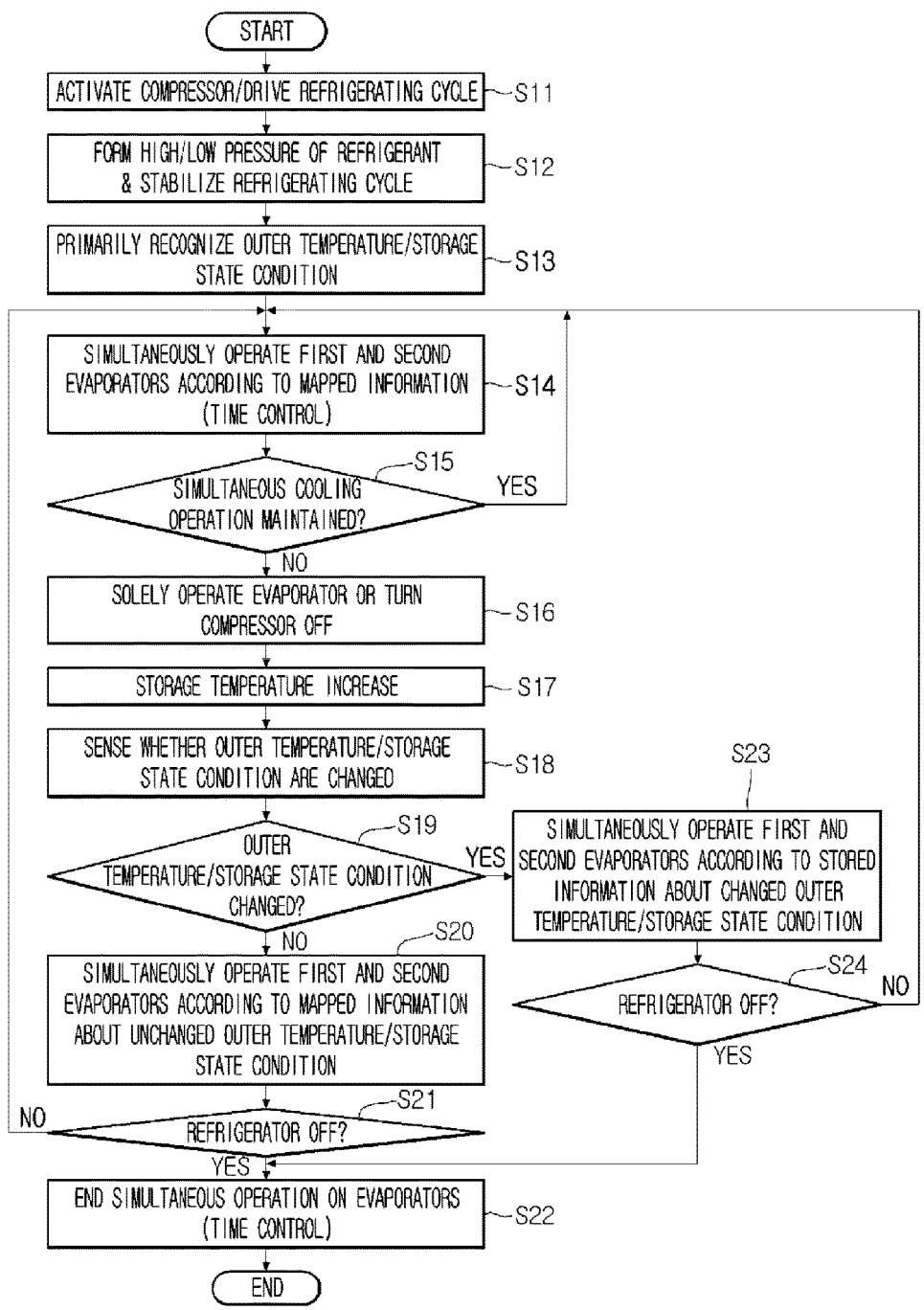
FIG. 3 is a flowchart illustrating a method of controlling the refrigerator according to the embodiment of FIG. 1.

FIG. 2 is a block diagram illustrating a configuration of the refrigerator according to the embodiment of FIG. 1. FIG. 3 is a flowchart illustrating a method of controlling the refrigerator according to the embodiment of FIG. 1.

Referring to FIG. 2, the refrigerator 10 may include a plurality of temperature sensors 210, 220, and 230 for sensing an inner temperature of a storage of the refrigerator 10 or an outer temperature of the refrigerator 10, for example, a temperature of an indoor space in which the refrigerator 10 is installed. The temperature sensors 210, 220, and 230 may include a refrigerator compartment temperature sensor 210 for sensing an inner temperature of the refrigerator compartment, a freezer compartment temperature sensor 220 for sensing an inner temperature of the freezer compartment, and an outer temperature sensor 230 for sensing the outer temperature of the refrigerator 10. The outer temperature sensor 230 may sense an ambient temperature. The sensors 210 and 220 may be referred to as "storage temperature sensors".

Further, the refrigerator 10 may include a control part 200 that controls an operation of the flow adjusting part 130, based on temperature values sensed at the temperature sensors 210, 220, and 230. The control part 200 may control operations of the first and second compressors 111 and 115, the condensing fan 125, and the first and second evaporation fans 155 and 165 for simultaneous cooling operation on the refrigerator compartment and the freezer compartment or a cooling operation on any one of the refrigerator compartment and the freezer compartment.

Further, the refrigerator 10 may include a timer 240 that integrates elapsed time values for operating the flow adjusting part 130 during the simultaneous cooling operation on the refrigerator compartment and the freezer compartment. For example, the timer 240 may integrate elapsed times when the first to third refrigerant passages 101, 103, and 105 are opened, or elapsed times when the first and second refrigerant passages 101 and 103 are opened.

Further, the refrigerator 10 may include a memory part 250 that stores time values for simultaneously operating the refrigerator compartment and the freezer compartment, and the time values may be mapped to information about an outer temperature condition of the refrigerator 10, for example, information about the outer temperature of the refrigerator 10, and information about a temperature condition of the storage of the refrigerator 10, for example, information about the inner temperature of the refrigerator compartment or the freezer compartment.

In particular, an outer temperature value may be sensed by the outer temperature sensor 230, and a state condition or state information of a storage may be determined based on a temperature value sensed at the refrigerator compartment temperature sensor 210 or the freezer compartment temperature sensor 220, or based on information about whether the compressor 110 is activated. The compressor 110 may include the first compressor 111 and the second compressor 115.

For example, the state condition may include a "cooling activation" state, a "freezer compartment load reaction" state, a "refrigerator compartment load reaction" state, and a "simultaneous storage cooling (simultaneous cooling of the refrigerator compartment and the freezer compartment)" state.

The "cooling activation" state may be understood as a state in which re-driving of the compressor 110 starts after the compressor 110 is turned off. For example, the "cooling activation" state may range from a state in which the compressor 110 is turned off and a high pressure and a lower pressure of the refrigerant are outside a set range, to a state in which the refrigerant has a pressure within the set range after the compressor 110 is activated before operation in step S12 of FIG. 3. For example, the cooling activation state may be maintained for about 2 to 3 minutes after an operation of the compressor 110 starts.

The "freezer compartment load reaction" state may be understood as a state in which a temperature of the freezer compartment unexpectedly increases, for example, a state in which a door of the freezer compartment is opened for a long time and the temperature of the freezer compartment unexpectedly increases to a temperature equal to or higher than a set temperature. The "refrigerator compartment load reaction" state may be understood as a state in which a temperature of the refrigerator compartment unexpectedly increases, for example, a state in which a door of the refrigerator compartment is opened for a long time and the temperature of the refrigerator compartment unexpectedly increases to a temperature equal to or higher than a set temperature.

The "simultaneous storage cooling (simultaneous cooling of the refrigerator compartment and the freezer compartment)" state may be understood as a state in which simultaneous cooling of the refrigerator compartment and the freezer compartment is needed, for example, a state in which the inner temperatures of the refrigerator compartment and the freezer compartment fail to reach target temperatures.

According to the current embodiment, the memory part 250 may store mapped information as shown in table 1.

TABLE 1

| | | OUTER TEMPERATURE CONDITION | | | | | |
|---|---|---|---|---|---|---|---|
| | | OUTER TEMPERATURE ≤16° C. | | 16° C. < OUTER TEMPERATURE ≤28° C. | | OUTER TEMPERATURE >28° C. | |
| | | CASE 1 | CASE 2 | | | | |
| STORAGE STATE CONDITION | COOLING ACTIVATION | 90 seconds | 90 seconds | 100 seconds | 120 seconds | 110 seconds | 150 seconds |
| | FREEZER COMPARTMENT LOAD REACTION | 90 seconds | 120 seconds | 120 seconds | 150 seconds | 150 seconds | 180 seconds |
| | REFRIGERATOR COMPARTMENT LOAD REACTION | 120 seconds | 90 seconds | 150 seconds | 120 seconds | 180 seconds | 150 seconds |

TABLE 1-continued

| | | OUTER TEMPERATURE CONDITION | | | | |
|---|---|---|---|---|---|---|
| | | OUTER TEMPERATURE ≤16° C. | | 16° C. < OUTER TEMPERATURE ≤28° C. | | OUTER TEMPERATURE >28° C. |
| | | CASE 1 | CASE 2 | | | |
| SIMULTANEOUS STORAGE COOLING | | 60 seconds | 100 seconds | 90 seconds   150 seconds | | 120 seconds   180 seconds |

Referring to table 1, "case 1" may be a first control state of the flow adjusting part 130 in which the flow adjusting part 130 is adjusted to open the first to third refrigerant passages 101, 103, and 105. For example, "case 1" may be a control state for addressing an unequal introduction of the refrigerant to the second evaporator 160. Case 1 may be referred to as "a first adjustment state" of the flow adjusting part 130.

Case 2" may be a second control state of the flow adjusting part 130 in which the flow adjusting part 130 is adjusted to open the first and second refrigerant passages 101 and 103 and close the third refrigerant passage 105. For example, "case 2" may be a control state for addressing an unequal introduction of the refrigerant to the first evaporator 150. Case 2 may be referred to as "a second adjustment state" of the flow adjusting part 130.

For example, when a storage state condition is the "cooling activation" state, and the outer temperature of the refrigerator 10 is equal to or lower than 16° C., the flow adjusting part 130 may be controlled for 90 seconds according to case 1 and may then be controlled for 90 seconds according to case 2.

When the storage state condition is the "cooling activation" state, and the outer temperature of the refrigerator 10 is higher than 16° C. and equal to or lower than 28° C., the flow adjusting part 130 may be controlled for 100 seconds according to case 1 and may then be controlled for 120 seconds according to case 2.

For another example, when the storage state condition is the "freezer compartment load reaction" state, and the outer temperature of the refrigerator 10 is equal to or lower than 16° C., the flow adjusting part 130 may be controlled for 90 seconds according to case 1 and may then be controlled for 120 seconds according to case 2.

When the storage state condition is the "freezer compartment load reaction" state, and the outer temperature of the refrigerator 10 is higher than 16° C. and equal to or lower than 28° C., the flow adjusting part 130 may be controlled for 120 seconds according to case 1 and may then be controlled for 150 seconds according to case 2.

For another example, when the storage state condition is the "refrigerator compartment load reaction" state, and the outer temperature of the refrigerator 10 is equal to or lower than 16° C., the flow adjusting part 130 may be controlled for 120 seconds according to case 1 and may then be controlled for 90 seconds according to case 2.

When the storage state condition is the "refrigerator compartment load reaction" state, and the outer temperature of the refrigerator 10 is higher than 16° C. and equal to or lower than 28° C., the flow adjusting part 130 may be controlled for 150 seconds according to case 1 and may then be controlled for 120 seconds according to case 2.

For another example, when the storage state condition is the "simultaneous storage cooling" state, and the outer temperature of the refrigerator 10 is equal to or lower than 16° C., the flow adjusting part 130 may be controlled for 60 seconds according to case 1 and may then be controlled for 100 seconds according to case 2.

When the storage state condition is the "simultaneous storage cooling" state, and the outer temperature of the refrigerator 10 is higher than 16° C. and equal to or lower than 28° C., the flow adjusting part 130 may be controlled for 90 seconds according to case 1 and may then be controlled for 150 seconds according to case 2.

A control time of the flow adjusting part 130 according to case 1 may be referred to as "a first set time" or "first prescribed period of time," and a control time of the flow adjusting part 130 according to case 2 may be referred to as "a second set time" or "second prescribed period of time."

Information about time values as shown in table 1, based on which control is performed according to a series of cases 1 and 2 under outer temperature conditions and storage state conditions, may be obtained through repeated experiment. Moreover, while the present disclosure describes preventing, for example, an unequal introduction of refrigerant into a particular evaporator, the present disclosure is not limited thereto, and may also control to limit a prescribed amount of refrigerant that flows into a particular evaporator relative to other evaporators. That is, when it is determined that the flow rate or amount of refrigerant flowing through the first evaporator 150 is excessive or greater than a prescribed amount, the control part 200 may control the flow adjusting part 130 to allow more refrigerant to flow through the second evaporator 160 by, for example, performing the time control operation sequentially for case 1 that prevents excessive flow of refrigerant through the second evaporator 160 (e.g., by increasing flow through the first evaporator 150) and then case 2 that prevents excessive flow of refrigerant through the first evaporator 150 for prescribed amounts of time.

The refrigerator 10 may include a target temperature setting part 260 to which the target temperatures of the refrigerator compartment or the freezer compartment are input. For example, the target temperature setting part 260 may be disposed on a front surface of the door of the refrigerator compartment or the freezer compartment, in a location where a user can conveniently manipulate the target temperature setting part 290. Information input through the target temperature setting part 260 may be used as control reference information for the compressor 110, the blower fans 125, 155, and 165, or the flow adjusting part 130.

Referring to FIG. 3, a method of controlling the refrigerator 10 according to the current embodiment will now be described. The first and second compressors 111 and 115 may be activated to operate the refrigerator 10. As the compressor 110 is activated, the refrigerating cycle may be driven according to compression, condensation, expansion, and evaporation of the refrigerant. The refrigerant evaporated at the second evaporator 160 may be compressed at the second compressor 115, join the refrigerant evaporated at the first evaporator 150, and be introduced into the first compressor 111, in step S11.

The simultaneous cooling operation may be performed on the refrigerator compartment and the freezer compartment in an initial stage according to the driving of the refrigerating cycle. When a predetermined amount of time has elapsed, pressure values according to refrigerant circulation may reach set ranges. For example, high pressures of the refrigerant discharged from the first and second compressors 111 and 115, and low pressures of the refrigerant discharged from the first and second evaporators 150 and 160 may be formed in set ranges.

When the high and low pressures of the refrigerant are formed in the set ranges, the refrigerating cycle may be stabilized and may be continually driven. At this point, a target temperature of the storage of the refrigerator 10 may be preset, in step S12.

During the driving of the refrigerating cycle, the temperature sensors 210, 220, and 230 may primarily sense temperature conditions related to the inner temperature of the storage and the outer temperature of the refrigerator 10. An outer temperature condition and a storage state condition as shown in table 1 may be determined considering the sensed temperature conditions and whether the compressor 110 is activated, in step S13.

When an outer temperature condition and a storage state condition are determined, the simultaneous cooling operation may be performed on the refrigerator compartment and the freezer compartment according to the mapped information of table 1. For example, a time control operation may be performed according to case 1 to prevent the refrigerant from being unequally introduced to the second evaporator 160, and then, a time control operation may be performed according to case 2 to prevent the refrigerant from being unequally introduced to the first evaporator 150, in step S14.

When the simultaneous cooling operation is performed once according to cases 1 and 2, whether the simultaneous cooling operation on the refrigerator compartment and the freezer compartment is to be maintained may be determined. In particular, the refrigerator compartment temperature sensor 210 and the freezer compartment temperature sensor 220 may sense whether the temperature of the refrigerator compartment or the freezer compartment reaches the target temperature.

When the temperature of the refrigerator compartment or the freezer compartment reaches the target temperature, cooling of the storage as the refrigerator compartment or the freezer compartment may be unnecessary, and thus, the simultaneous cooling operation may also be unnecessary.

Thus, the storage as the refrigerator compartment or the freezer compartment, the temperature of which does not reach the target temperature, may be solely cooled, for example, the evaporator corresponding to the storage may solely be operated. When the temperatures of the refrigerator compartment and the freezer compartment reach the target temperatures, the operation of the compressor 110 may be turned off.

When the temperatures of the refrigerator compartment and the freezer compartment do not reach the target temperatures, operation in step S14 may be performed again to simultaneously operate the first and second evaporators 150 and 160 again. The simultaneous operation may be repeated until at least one of the refrigerator compartment and the freezer compartment reaches the target temperature, in steps S15 and S16.

Thereafter, in step S16, the evaporator is solely operated or the operation of the compressor 110 is turned off, and the temperature of the refrigerator compartment or the freezer compartment may increase. When the temperature of the refrigerator compartment or the freezer compartment exceeds a target temperature range, cooling of a storage such as the refrigerator compartment or the freezer compartment, or cooling activation of the compressor 110 from the off state may be needed. At this point, it may be sensed whether the outer temperature condition or the storage state condition as shown in table 1 has changed or not.

For example, when the outer temperature has changed to be outside a control reference range, for example, when the outer temperature is changed from 17° C. to 15° C., it may be determined whether the cooling activation of the compressor 110 may be performed from the off state, whether a load reaction of a storage occurs, or whether the simultaneous cooling of the refrigerator compartment and the freezer compartment is needed, in steps S17 and S18.

When the outer temperature condition or the storage state condition has not changed, for example, when the outer temperature condition or the storage state condition recognized in operation in step S13 has not changed, a simultaneous cooling operation may be performed on the first and second evaporators 150 and 160 according to cases 1 and 2 and the mapped information of the unchanged outer temperature condition or the unchanged storage state condition, in steps S19 and S20.

On the contrary, when the outer temperature condition or the storage state condition has changed, for example, when the outer temperature condition or the storage state condition has changed from that recognized in operation in step S13, the simultaneous cooling operation may be performed on the first and second evaporators 150 and 160 according to cases 1 and 2 and the mapped information of the changed outer temperature condition or the changed storage state condition, in step S23. That is, an appropriate operation may be performed based on the newly obtained condition information based on the stored information.

To sum up, since the refrigerator 10 is a product that is driven at all times, and the compressor 110 is turned on and off repeatedly, and a temperature of the storage of the refrigerator 10 is changed after electric power is applied to the refrigerator 10, the flow adjusting part 130 may be repeatedly controlled according to cases 1 and 2 based on the mapped information of the outer temperature conditions and the storage state conditions as shown in table 1.

The method of controlling the refrigerator 10 may be performed until the refrigerator 10 is turned off to end the simultaneous operation (time controls) of the first and second evaporators 150 and 160, in steps S21, S22, and S24.

As such, while the simultaneous operation of the first and second evaporators 150 and 160 is performed, controls of the flow adjusting part 130 for preventing the refrigerant from being unequally introduced to the first and second evaporators 150 and 160 may be sequentially performed according to cases 1 and 2, thereby improving cooling efficiency of the storage of the refrigerator 10 and operation efficiency of the refrigerator 10.

Hereinafter, descriptions will be made according to other embodiments. Here, different parts between the previous embodiment and the current embodiments will be described principally, and a description of the same parts thereof will be omitted, and like reference numerals denote like elements throughout.

Figure 4:
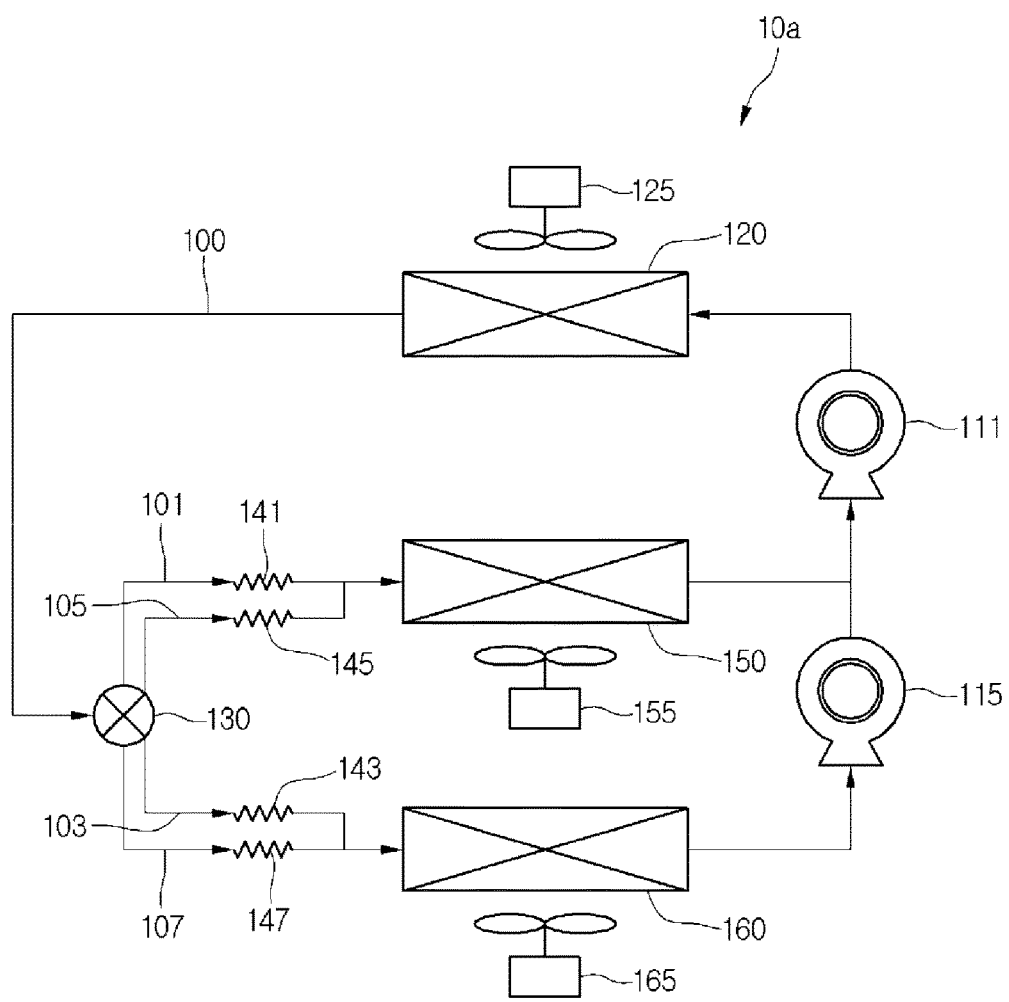
FIG. 4 is a schematic view illustrating a configuration of a refrigerating cycle of a refrigerator according to another embodiment.

FIG. 4 is a schematic view illustrating a configuration of a refrigerating cycle of a refrigerator according to another embodiment. A refrigerator 10a according to the current embodiment may include a refrigerant pipe arrangement 100 for guiding a flow of refrigerant condensed at a condenser 120, a flow adjusting part 130 installed on the refrigerant pipe arrangement 100 and configured to divide the refrigerant to flow into the first and second evaporators 150 and 160, and a plurality of refrigerant passages 101, 103, 105, and 107 that extend from an outlet side of the flow adjusting part 130 to the first and second evaporators 150 and 160.

The refrigerant passages 101, 103, 105, and 107 may be understood as "branch passages" diverging from the refrigerant pipe arrangement 100 and may include first and third refrigerant passages 101 and 105 connected to the first evaporator 150, and second and fourth refrigerant passages 103 and 107 connected to the second evaporator 160.

The first and third refrigerant passages 101 and 105 may guide the refrigerant to be introduced into the first evaporator 150 and may be referred to as "first evaporation passages." The second and fourth refrigerant passages 103 and 107 may guide the refrigerant to be introduced into the second evaporator 160 and may be referred to as "second evaporation passages."

The refrigerant flowing through the first refrigerant passage 101 and the refrigerant flowing through the third refrigerant passage 105 may join each other and be then introduced into the first evaporator 150. The refrigerant flowing through the second refrigerant passage 103 and the refrigerant flowing through the fourth refrigerant passage 107 may be joined to be introduced into the second evaporator 160.

As described according to the previous embodiment, the refrigerant discharged from the second evaporator 160 may be introduced into a second compressor 115, and the refrigerant compressed at the second compressor 115 may join the refrigerant discharged from the first evaporator 150 and be introduced into a first compressor 111.

A plurality of expansion devices 141, 143, 145, and 147 may be disposed on the refrigerant passages 101, 103, 105, and 107. The expansion devices 141, 143, 145, and 147 may include capillary tubes. In particular, the expansion devices 141, 143, 145, and 147 may include a first expansion device 141 disposed on the first refrigerant passage 101, a second expansion device 143 disposed on the second refrigerant passage 103, a third expansion device 145 disposed on the third refrigerant passage 105, and a fourth expansion device 147 disposed on the fourth refrigerant passage 107.

The flow adjusting part 130 may include a five-way valve, which includes an inflow part through which the refrigerant is introduced, and four outflow parts through which the refrigerant is discharged. The first to fourth refrigerant passages 101, 103, 105, and 107 may be connected to the four outflow parts.

At least one of the first refrigerant passage 101 and the third refrigerant passage 105, and at least one of the second refrigerant passage 103 and the fourth refrigerant passage 107 may be opened according to a control of the flow adjusting part 130. Alternatively, any one of the first evaporation passages 101 and 105 and the second evaporation passages 103 and 107 may be closed.

For example, the first to third refrigerant passages 101, 103, and 105 may be opened, and the fourth refrigerant passage 107 may be closed. In this case, an amount of the refrigerant introduced into the first evaporator 150 may be greater than an amount of the refrigerant introduced into the second evaporator 160.

Alternatively, the first, second, and fourth refrigerant passages 101, 103, and 107 may be opened, and the third refrigerant passage 105 may be closed. In this case, an amount of the refrigerant introduced into the second evaporator 160 may be greater than an amount of the refrigerant introduced into the first evaporator 150.

As such, a plurality of refrigerant passages and a plurality of expansion devices may be disposed at an inlet side of the first and second evaporators 150 and 160, and at least one of the refrigerant passages may be opened or closed according to whether refrigerant introduced into the first and second evaporators 150 and 160 is excessive or insufficient, thereby controlling a flow rate of the refrigerant. Thus, while a plurality of evaporators is simultaneously operated, refrigerant may be prevented from being unequally introduced into any one of the evaporators.

The description of the method as illustrated in FIG. 3 is applied to a method of controlling a refrigerator according to the current embodiment. However, the current embodiment and the previous embodiment are different in control state of the flow adjusting part 130 according to cases 1 and 2.

In particular, when the flow adjusting part 130 is controlled such that the first to third refrigerant passages 101, 103, and 105 are opened and the fourth refrigerant passage 107 is closed, time controls according to case 1 as illustrated in table 1 may be used.

When the flow adjusting part 130 is controlled such that the first, second, and fourth refrigerant passages 101, 103, and 107 are opened, and the third refrigerant passage 105 is closed, time controls according to case 2 as illustrated in table 1 may be used.

Figure 5:
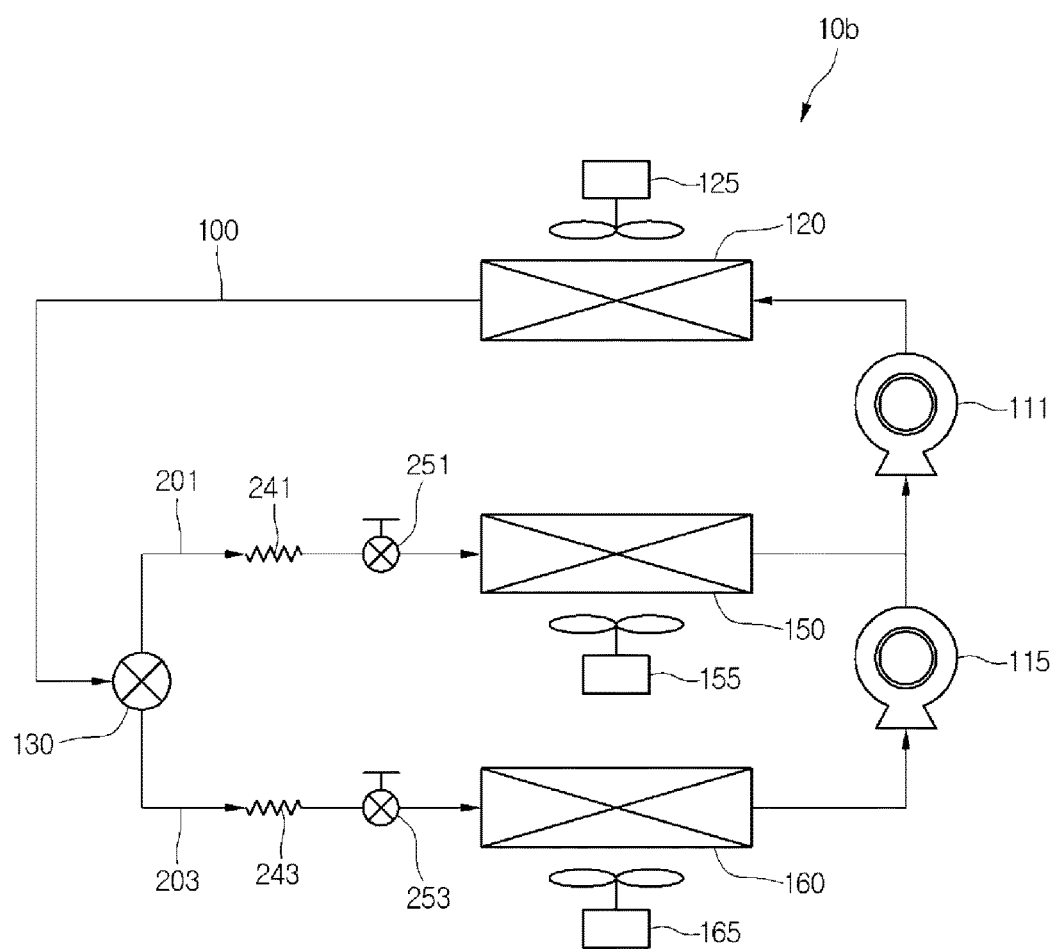
FIG. 5 is a schematic view illustrating a configuration of a refrigerating cycle of a refrigerator according to another embodiment.
Figure 6:
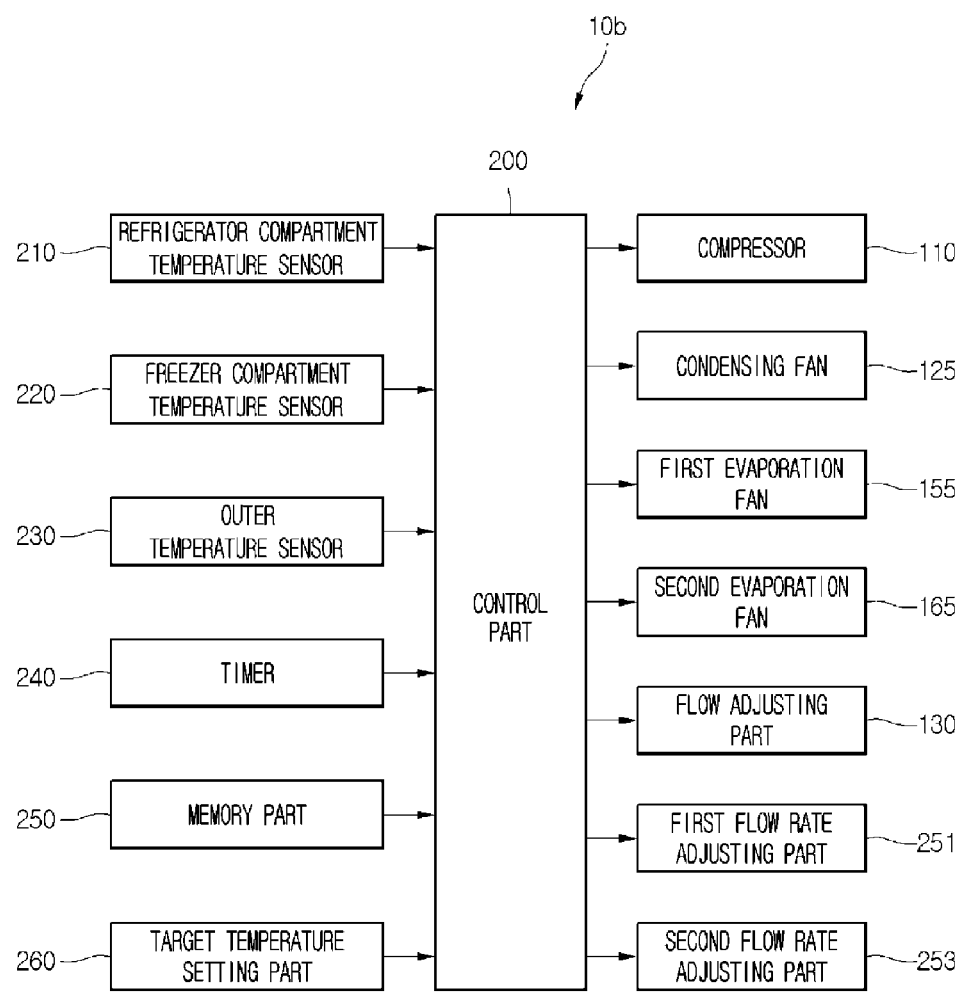
FIG. 6 is a block diagram illustrating a configuration of the refrigerator according to the embodiment of FIG. 5.

FIG. 5 is a schematic view illustrating a configuration of a refrigerating cycle of a refrigerator according to another embodiment. FIG. 6 is a block diagram illustrating a configuration of the refrigerator according to the embodiment of FIG. 5.

Referring to FIGS. 5 and 6, a refrigerator 10b according to the current embodiment may include a refrigerant pipe arrangement 100 for guiding a flow of refrigerant condensed at a condenser 120, a flow adjusting part 130 installed on the refrigerant pipe arrangement 100 and dividing the refrigerant into flows to first and second evaporators 150 and 160, and a plurality of refrigerant passages 201 and 203 extending from an outlet side of the flow adjusting part 130 to the first and second evaporators 150 and 160.

The refrigerant passages 201 and 203 may be understood as "branch passages" diverging from the refrigerant pipe arrangement 100 and may include a first refrigerant passage 201 connected to the first evaporator 150, and a second refrigerant passage 203 connected to the second evaporator 160.

A plurality of expansion devices 241 and 243 may be disposed on the refrigerant passages 201 and 203. The expansion devices 241 and 243 may include capillary tubes. In particular, the expansion devices 241 and 243 may include a first expansion device 241 disposed on the first refrigerant passage 201, and a second expansion device 243 disposed on the second refrigerant passage 203.

The flow adjusting part 130 may include a three-way valve, which includes an inflow part through which the refrigerant is introduced, and two outflow parts through which the refrigerant is discharged. The first and second refrigerant passages 201 and 203 may be connected to the two outflow parts. The flow adjusting part 130 may be controlled such that the refrigerant is simultaneously introduced into the first and second refrigerant passages 201 and 203.

The refrigerator 10 may include flow rate adjusting parts 251 and 253 for adjusting flows of the refrigerant. The flow rate adjusting parts 251 and 253 may be installed on at least one of the first and second refrigerant passages 201 and 203. For example, the flow rate adjusting parts 251 and 253 may include a first flow rate adjusting part 251 installed on the first refrigerant passage 201, and a second flow rate adjusting part 253 installed on the second refrigerant passage 203. The first and second flow rate adjusting parts 251 and 253 may include an electric expansion valve (EEV) to adjust degrees of opening of the first and second flow rate adjusting parts 251 and 253.

Referring to FIG. 5, the first and second flow rate adjusting parts 251 and 253 may be disposed at outlet sides of the first and second expansion devices 241 and 243, respectively. However, the first and second flow rate adjusting parts 251 and 253 may be disposed at inlet sides of the first and second expansion devices 241 and 243, respectively.

When the degree of the opening of the first or second flow rate adjusting part 251 or 253 is decreased, an amount of the refrigerant flowing through the opening may decrease. When the degree of the opening of the first or second flow rate adjusting part 251 or 253 is increased, the amount of the refrigerant flowing through the opening may increase.

For example, when the degree of the opening of the first flow rate adjusting part 251 is greater than the degree of the opening of the second flow rate adjusting part 253, a larger amount of the refrigerant may flow through the first refrigerant passage 201. On the contrary, when the degree of the opening of the second flow rate adjusting part 253 is greater than the degree of the opening of the first flow rate adjusting part 251, a larger amount of the refrigerant may flow through the second refrigerant passage 203.

The first and second flow rate adjusting parts 251 and 253 may minutely adjust a degree of opening of a refrigerant passage, so as to minutely adjust an amount of the refrigerant to be introduced into the first evaporator 150 or the second evaporator 160. As a result, while the first and second evaporators 150 and 160 are simultaneously operated, the refrigerant may be prevented from being unequally introduced into the first or second evaporator 150 or 160.

Referring to FIG. 5, the first and second flow rate adjusting parts 251 and 253 may be disposed on the first and second refrigerant passages 201 and 203, respectively. However, in an alternative embodiment, a flow rate adjusting part may be disposed on the first or second refrigerant passage 201 or 203. For example, only the flow rate adjusting part 251 may be disposed on the first refrigerant passage 201.

A flow rate adjusting part may be provided on any one of refrigerant passages to adjust a degree of opening thereof, thereby relatively adjusting an amount of refrigerant passing through the other. For example, when a degree of opening of the flow rate adjusting part increases, the amount of the refrigerant passing through the second refrigerant passage may decrease. When the degree of the opening of the flow rate adjusting part decreases, the amount of the refrigerant passing through the second refrigerant passage may increase.

In one embodiment, the flow rate adjusting parts 251 and 253 may be individually provided on the refrigerant passages 101, 103, 105, and 107 as described according to the previous embodiments. In this case, a flow rate of the refrigerant may be minutely adjusted.

The description of the method as illustrated in FIG. 3 may be applied to a method of controlling a refrigerator according to the current embodiment. However, the current embodiment and the previous embodiment are different in control state of the first and second flow rate adjusting parts 251 and 253 according to cases 1 and 2.

In particular, when the first and second flow rate adjusting parts 251 and 253 are controlled such that an amount of the refrigerant flowing through the first refrigerant passage 201 is greater than an amount of the refrigerant flowing through the second refrigerant passage 203, the time controls according to case 1 as illustrated in table 1 may be used. For example, the degree of the opening of the first flow rate adjusting part 251 may be controlled to be greater than the degree of the opening of the second flow rate adjusting part 253.

When the first and second flow rate adjusting parts 251 and 253 are controlled such that the amount of the refrigerant flowing through the second refrigerant passage 203 is greater than the amount of the refrigerant flowing through the first refrigerant passage 201, the time controls according to case 2 as illustrated in table 1 may be used. For example, the degree of the opening of the second flow rate adjusting part 253 may be controlled to be greater than the degree of the opening of the first flow rate adjusting part 251.

Figure 7:
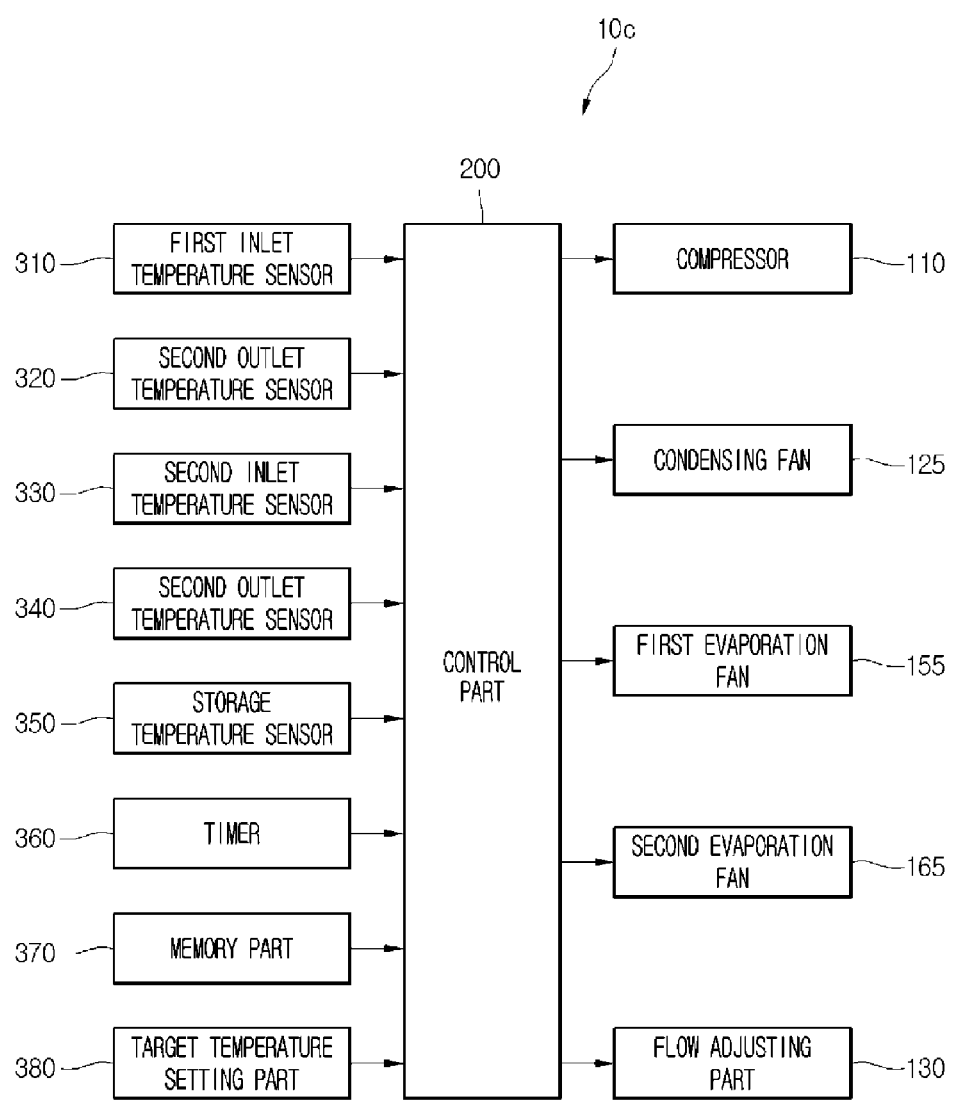
FIG. 7 is a block diagram illustrating a configuration of a refrigerator according to another embodiment.
Figure 8:
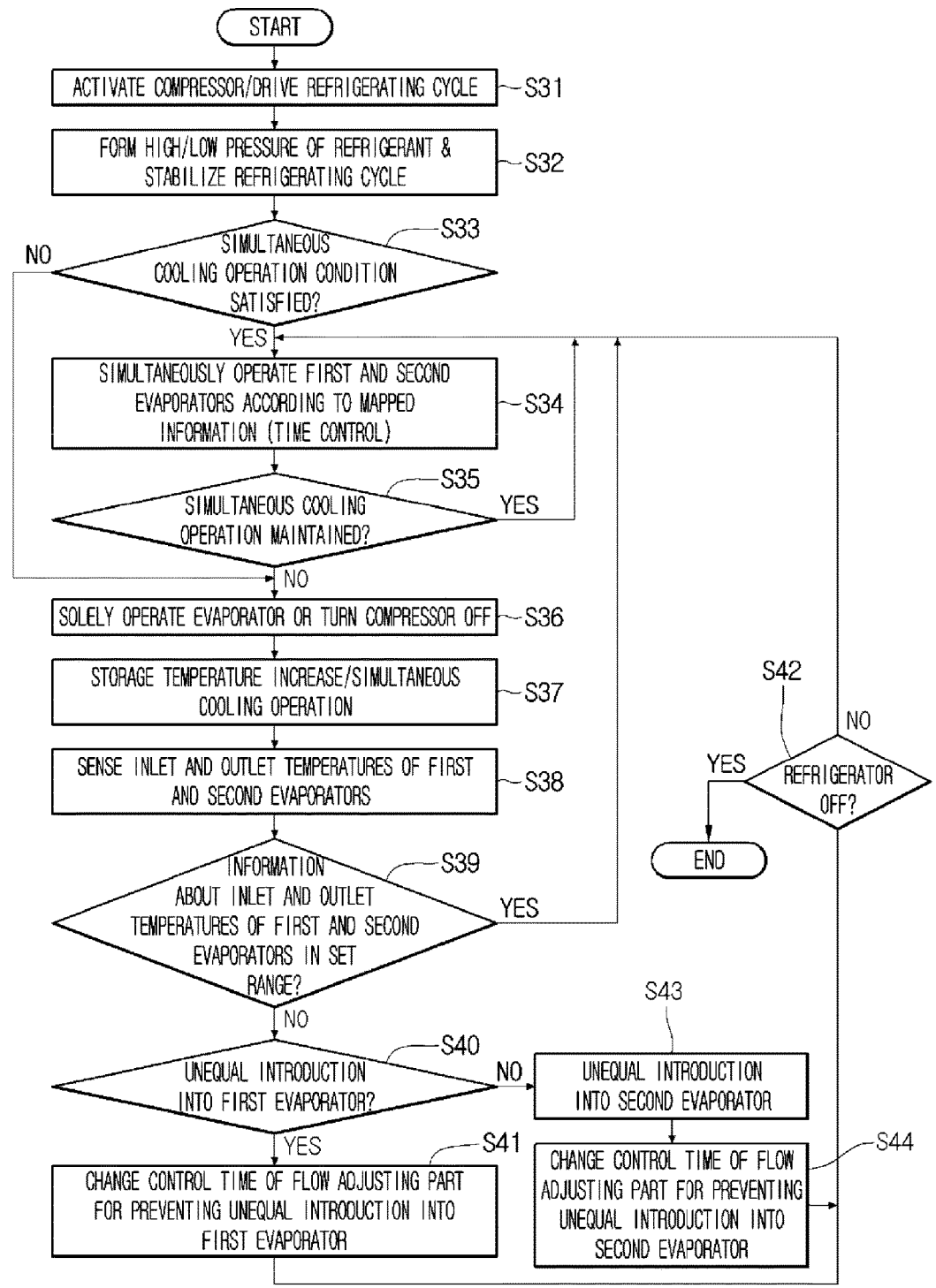
FIG. 8 is a flowchart illustrating a method of controlling the refrigerator according to the embodiment of FIG. 7.

FIG. 7 is a block diagram illustrating a configuration of a refrigerator according to another embodiment. FIG. 8 is a flowchart illustrating a method of controlling the refrigerator according to the embodiment of FIG. 7. Components of the refrigerator as illustrated in FIG. 7 may be formed by adding components to the cycle components of the refrigerator of FIG. 1.

Referring to FIG. 7, a refrigerator 10c according to the current embodiment may include a plurality of temperature sensors 310, 320, 330, and 340 for sensing inlet temperatures and outlet temperatures of a first evaporator 150 and a second evaporator 160. The temperature sensors 310, 320, 330, and 340 may include a first inlet temperature sensor 310 for sensing the inlet temperature of the first evaporator 150, and a first outlet temperature sensor 320 for sensing the outlet temperature of the first evaporator 150. Further, the temperature sensors 310, 320, 330, and 340 may include a second inlet temperature sensor 330 for sensing the inlet temperature of the second evaporator 160, and a second outlet temperature sensor 340 for sensing the outlet temperature of the second evaporator 160.

Further, the refrigerator 10c may include a control part 200 that controls an operation of a flow adjusting part 130, based on temperature values sensed at the temperature sensors 310, 320, 330, and 340. The control part 200 may control operations of a compressor 110, a condensing fan 125, and first and second evaporation fans 155 and 165 for a simultaneous cooling operation on a refrigerator compartment and a freezer compartment. The compressor 110 may include a first compressor 111 and a second compressor 115.

Further, the refrigerator 10c may include a storage temperature sensor 350 for sensing an inner temperature of a storage of the refrigerator 10c. The storage temperature sensor 350 may include a refrigerator compartment temperature sensor disposed in the refrigerator compartment to sense an inner temperature of the refrigerator compartment, and a freezer compartment temperature sensor disposed in the freezer compartment to sense a temperature of the freezer compartment.

The refrigerator 10c may include a target temperature setting part 380 to which a target temperature of the refrigerator compartment or the freezer compartment is input. Information input through the target temperature setting part 380 may be used as control reference information for the compressor 110, blower fans 125, 155, and 165, or the flow adjusting part 130. For example, based on the information input through the target temperature setting part 380, and information sensed at the storage temperature sensor 350, the control part 200 may determine whether to perform the simultaneous cooling operation on the refrigerator compartment and the freezer compartment, a single operation of any one of the refrigerator compartment and the freezer compartment, or turning off of the compressor 110.

For example, when inner temperatures of the refrigerator compartment and the freezer compartment are higher than the temperatures input through the target temperature setting part 380, the control part 200 may control the compressor 110 and the flow adjusting part 130 to perform the simultaneous cooling operation.

When the inner temperature of the freezer compartment is higher than the temperature input through the target temperature setting part 380, and the inner temperature of the refrigerator compartment is lower than the temperature input through the target temperature setting part 380, the control part 200 may control the compressor 110 and the flow adjusting part 130 to perform a single operation on the freezer compartment.

When the inner temperatures of the refrigerator compartment and the freezer compartment are lower than the temperatures input through the target temperature setting part 380, the control part 200 may turn the operation of the compressor 110 off.

Further, the refrigerator 10c may include a timer 360 that integrates elapsed time values for operating the flow adjusting part 130 during the simultaneous cooling operation on the refrigerator compartment and the freezer compartment. For example, the timer 360 may integrate elapsed times when first to third refrigerant passages 101, 103, and 105 are opened, or elapsed times when the first and second refrigerant passages 101 and 103 are opened.

Further, the refrigerator 10c may include a memory part 370 that stores time values mapped to adjustment states of the flow adjusting part 130 during the simultaneous cooling operation on the refrigerator compartment and the freezer compartment.

In particular, according to the current embodiment, the memory part 370 may store mapped information as shown in table 2.

TABLE 2

| EQUAL OR UNEQUAL INTRODUCTION OF REFRIGERANT | CASE 1 | CASE 2 |
|---|---|---|
| START OF SIMULTANEOUS COOLING OPERATION (REFERENCE VALUE) | 90 seconds | 90 seconds |
| UNEQUAL INTRODUCTION OF REFRIGERANT TO FIRST EVAPORATOR | 90 seconds | 120 seconds |
| UNEQUAL INTRODUCTION OF REFRIGERANT TO SECOND EVAPORATOR | 90 seconds | 60 seconds |

Referring to table 2, "case 1" may be a first control state (adjustment state) of the flow adjusting part 130 in which the flow adjusting part 130 is adjusted to open the first to third refrigerant passages 101, 103, and 105. "Case 2" may be a second control state (adjustment state) of the flow adjusting part 130 in which the flow adjusting part 130 is adjusted to open the first and second refrigerant passages 101 and 103 and close the third refrigerant passage 105.

For example, when a simultaneous cooling operation condition is satisfied, such as when cooling of the refrigerator compartment and the freezer compartment is needed, the simultaneous cooling operation may start. At this point, the control part 200 may control the flow adjusting part 130 to be maintained in the first control state for 90 seconds, and be then maintained in the second control state for 90 seconds. The first and second control states of the flow adjusting part 130 may be alternately performed until the simultaneous cooling operation is unnecessary.

When a temperature of the refrigerator compartment or the freezer compartment reaches the target temperature while the first and second control states of the flow adjusting part 130 are alternately performed, a supply of the refrigerant to at least one of the first and second evaporators 150 and 160 may be stopped (a single operation of an evaporator). When the temperatures of the refrigerator compartment and the freezer compartment reach the target temperatures, the compressor 110 may be turned off.

When the single operation of an evaporator or an off state of the compressor 110 is maintained for a predetermined amount of time, the simultaneous cooling operation on the refrigerator compartment and the freezer compartment may be needed. In this case, the control part 200 may recognize whether the refrigerant is unequally supplied to an evaporator, based on the temperature values of the temperature sensors 310, 320, 330, and 340.

When the control part 200 recognizes that the refrigerant is unequally introduced into the first evaporator 150, the control part 200 may use variations of time values according to cases 1 and 2. For example, when the refrigerant is unequally introduced into the first evaporator 150, an amount of time in which the refrigerant is supplied to the second evaporator 160 should be relatively increased. Thus, a control time in case 2 may be increased (120 seconds).

On the contrary, when the refrigerant is unequally introduced into the second evaporator 160, the control part 200 may decrease the control time in case 2 (60 seconds) to relatively increase the amount of time in which the refrigerant is supplied to the first evaporator 150.

For example, when it is recognized that the refrigerant is unequally introduced into a particular evaporator, a control time in case 2 may be adjusted to prevent the refrigerant from being unequally introduced into that evaporator. It may be recognized that a cooling load of a storage on which the second evaporator 160 is disposed is smaller than a cooling load of a storage on which the first evaporator 150 is disposed.

As a result, a control time in case 1 for increasing an amount of the refrigerant supplied to the storage having the large cooling load may be fixed, and a control time in case 2 for increasing an amount of the refrigerant supplied to the storage having the small cooling load may be changed. Accordingly, cooling efficiency of the storage having the large cooling load may be stably maintained.

A control time of the flow adjusting part 130 according to case 1 may be referred to as "a first set time" or "a first prescribed amount of time," and a control time of the flow adjusting part 130 according to case 2 may be referred to as "a second set time" or "a second prescribed amount of time."

Information about time values of sequentially performing cases 1 and 2 in the simultaneous cooling operation, and information about variations of the time values of sequentially performing cases 1 and 2 when the refrigerant is unequally introduced into an evaporator, as illustrated in table 2, may be obtained through repeated experiment.

Referring to FIG. 8, a method of controlling the refrigerator 10c according to the current embodiment will now be described. The first and second compressors 111 and 115 may be activated to operate the refrigerator 10c. As the compressor 110 is activated, a refrigerating cycle may be driven according to compression, condensation, expansion, and evaporation of the refrigerant. The refrigerant evaporated at the second evaporator 160 may be compressed at the second compressor 115, join the refrigerant evaporated at the first evaporator 150, and be introduced into the first compressor 111, in step S31.

The simultaneous cooling operation may be performed on the refrigerator compartment and the freezer compartment in an initial stage according to the driving of the refrigerating cycle. When a predetermined amount of time has elapsed, a pressure value according to a refrigerant circulation may reach a set range. For example, high pressures of the refrigerant discharged from the first and second compressors 111 and 115, and low pressures of the refrigerant discharged from the first and second evaporators 150 and 160 may be formed in set ranges.

When the high and low pressures of the refrigerant are formed in the set ranges, the refrigerating cycle may be stabilized and may be driven continuously. At this point, a target temperature of the storage of the refrigerator 10c may be preset, in step S32.

While the refrigerating cycle is driven, it may be recognized whether the simultaneous cooling operation condition for the refrigerator compartment and the freezer compartment is satisfied. For example, when it is recognized based on a value sensed at the storage temperature sensor 350 that the inner temperatures of the refrigerator compartment and the freezer compartment are equal to or higher than the target temperature, the simultaneous cooling operation may be performed on the refrigerator compartment and the freezer compartment, in step S33.

When the simultaneous cooling operation is performed, the first and second evaporators 150 and 160 may be simultaneously operated according to pre-mapped information. For example, the operation of the flow adjusting part 130 may be controlled to simultaneously supply the refrigerant to the first and second evaporators 150 and 160.

At this point, the flow adjusting part 130 may be adjusted such that the first control state according to case 1 is maintained for 90 seconds, and then, the second control state according to case 2 is maintained for 90 seconds, as illustrated in table 2. For example, a time control operation may be performed according to case 1 to prevent the refrigerant from being unequally introduced into the second evaporator 160, and then, a time control operation may be performed according to case 2 to prevent the refrigerant from being unequally introduced into the first evaporator 150, in step S34.

When the simultaneous cooling operation is performed once according to cases 1 and 2, whether the simultaneous cooling operation on the refrigerator compartment and the freezer compartment should be maintained may be recognized. In particular, the storage temperature sensor 350 may sense whether the temperature of the refrigerator compartment or the freezer compartment reaches the target temperature. When the temperature of the refrigerator compartment or the freezer compartment reaches the target temperature, the cooling of the refrigerator compartment or the freezer compartment may be unnecessary, and thus, the simultaneous cooling operation may also be unnecessary.

Thus, a storage such as the refrigerator compartment or the freezer compartment, the temperature of which does not reach the target temperature, may be solely cooled, for example, an evaporator corresponding to the storage may be solely operated. When the temperatures of the refrigerator compartment and the freezer compartment reach the target temperatures, the operation of the compressor 110 may be turned off.

When the temperatures of the refrigerator compartment and the freezer compartment do not reach the target temperatures, operation in step S33 may be performed again to continue to simultaneously operate the first and second evaporators 150 and 160. The simultaneous operation may be repeated until at least one of the refrigerator compartment and the freezer compartment reaches the target temperature.

As such, while the simultaneous operation of the first and second evaporators 150 and 160 is performed, controls of the flow adjusting part 130 for preventing the refrigerant from being unequally introduced into the first and second evaporators 150 and 160 may be sequentially performed according to cases 1 and 2, thereby improving cooling efficiency of the storage of the refrigerator 10c and operation efficiency of the refrigerator 10c, in steps S35 and S36.

When a certain amount of time has elapsed from operation in step S36 in which the evaporator is solely operated or the operation of the compressor 110 is turned off, the temperature of the refrigerator compartment or the freezer compartment may increase. When the temperature of the refrigerator compartment or the freezer compartment exceeds a target temperature range, cooling of a storage as the refrigerator compartment or the freezer compartment, or the activation of the compressor 110 from the off state may again be needed. The simultaneous cooling operation may be performed again on the refrigerator compartment and the freezer compartment, in step S37.

While the simultaneous cooling operation is performed again, it may be determined whether control times of the flow adjusting part 130 according to cases 1 and 2 have changed. In particular, the inlet temperature and the outlet temperature of the first evaporator 150 may be sensed by the first inlet temperature sensor 210 and the first outlet temperature sensor 220. In addition, the inlet temperature and the outlet temperature of the second evaporator 160 may be sensed by the second inlet temperature sensor 230 and the second outlet temperature sensor 240, in step S38.

The control part 200 may determine a difference value between the inlet and outlet temperatures of the first evaporator 150 and a difference value between the inlet and outlet temperatures of the second evaporator 160.

When the amount of the refrigerant introduced into the first evaporator 150 or the second evaporator 160 is equal to or greater than an appropriate refrigerant amount, a difference between the inlet and outlet temperatures of the first or second evaporator 150 or 160 may decrease. On the contrary, when the amount of the refrigerant introduced into the first evaporator 150 or the second evaporator 160 is smaller than the appropriate refrigerant amount, the difference between the inlet and outlet temperatures of the first or second evaporator 150 or 160 may increase.

The control part 200 may recognize whether information about the difference between the inlet and outlet temperatures of the first and second evaporators 150 and 160 is within a set range. For example, whether the refrigerant flowing through the first or second evaporator 150 or 160 is excessive or insufficient, for example, whether the refrigerant is unequally introduced into the first or second evaporator 150 or 160, may be recognized by the control part 200 based on the difference between the inlet and outlet temperatures of the first and second evaporators 150 and 160.

In particular, whether the refrigerant flowing through the first or second evaporator 150 or 160 is excessive or insufficient may be determined based on one of the difference between the inlet and outlet temperatures of the first evaporator 150, a difference value between the difference between the inlet and outlet temperatures of the first evaporator 150 and the difference between the inlet and outlet temperatures of the second evaporator 160, and a ratio value between the difference between the inlet and outlet temperatures of the first evaporator 150 and the difference between the inlet and outlet temperatures of the second evaporator 160, in step S39.

For example, whether the refrigerant is unequally introduced may be determined according to whether the difference between the inlet and outlet temperatures of the first evaporator 150 is equal to, greater than, or smaller than a preset reference value. The flow adjusting part 130 may divide the refrigerant circulating through the refrigerating cycle into flows to the first evaporator 150 and the second evaporator 160. Thus, when the difference between the inlet and outlet temperatures of the first evaporator 150 is sensed, a ratio of the refrigerant passing through the first evaporator 150 may be recognized. A ratio of the refrigerant passing through the second evaporator 160 may be recognized based on the ratio of the refrigerant passing through the first evaporator 150.

For example, when the difference between the inlet and outlet temperatures of the first evaporator 150 is greater than the preset reference value, it may be determined that the amount of the refrigerant introduced to the first evaporator 150 is insufficient, and it may be recognized that the amount of the refrigerant introduced to the second evaporator 160 is relatively great.

A method of determining whether the refrigerant is unequally introduced, by using the difference between the inlet and outlet temperatures of the first evaporator 150 is described above. Alternatively, whether the refrigerant is unequally introduced may be determined using the difference between the inlet and outlet temperatures of the second evaporator 160.

When the difference between the inlet and outlet temperatures of the first evaporator 150 is equal to the preset reference value (a reference temperature), it may be recognized that the refrigerant is not unequally introduced to the first or second evaporator 150 or 160. In this case, operation in step S34 may be performed again to control the flow adjusting part 130, based on a time value set when the simultaneous cooling operation starts. For example, an adjustment state according to each of cases 1 and 2 may be maintained for 90 seconds. Then, operations in steps S35 to S38 may be performed again.

When the difference between the inlet and outlet temperatures of the first evaporator 150 is not equal to the preset reference value and is greater or smaller than the preset reference value, it may be determined that the refrigerant is unequally introduced to the first or second evaporator 150 or 160.

In particular, when the difference between the inlet and outlet temperatures of the first evaporator 150 is smaller than the preset reference value, it may be determined that a relatively large amount of the refrigerant passes through the first evaporator 150. For example, it may be determined that the refrigerant is unequally introduced into the first evaporator 150.

This case may correspond to a condition "unequal introduction of refrigerant to first evaporator" of table 2, and a control state of the flow adjusting part 130 according to case 1 may be maintained for 90 seconds, and a control state of the flow adjusting part 130 according to case 2 may be maintained for 120 seconds. For example, an adjustment time of the flow adjusting part 130 according to case 2 under the condition "unequal introduction of refrigerant to first evaporator" may be increased relative to an adjustment time of the flow adjusting part 130 according to case 2 under a condition "start of simultaneous cooling operation", thereby relatively decreasing the amount of the refrigerant introduced into the first evaporator 150, in steps S40 and S41.

When the difference between the inlet and outlet temperatures of the first evaporator 150 is greater than the preset reference value, it may be determined that a relatively small amount of the refrigerant passes through the first evaporator 150. For example, it may be determined that the refrigerant is unequally introduced into the second evaporator 160.

This case may correspond to a condition "unequal introduction of refrigerant to second evaporator" of table 2, and the control state of the flow adjusting part 130 according to case 1 may be maintained for 90 seconds, and the control state of the flow adjusting part 130 according to case 2 may be maintained for 120 seconds. For example, an adjustment time of the flow adjusting part 130 according to case 2 under the condition "unequal introduction of refrigerant to second evaporator" may be decreased relative to the adjustment time of the flow adjusting part 130 according to case 2 under the condition "start of simultaneous cooling operation," thereby relatively increasing the amount of the refrigerant introduced into the first evaporator 150, in steps S43 and S44.

When the control times of the flow adjusting part 130 are changed according to the above described method, operation in step S34 may be performed again based on values of the changed control times until the refrigerator 10c is turned off, in step S42. As such, the control times of the flow adjusting part 130 may be changed based on the information about the difference between the inlet and outlet temperatures of the first and second evaporators 150 and 160, thereby preventing the refrigerant from being unequally introduced into the first or second evaporator 150 or 160.

For another example of the determination in operation in step S39, whether the refrigerant is unequally introduced may be determined according to whether a ratio of the difference between the inlet and outlet temperatures of the first evaporator 150 to the difference between the inlet and outlet temperatures of the second evaporator 160 is equal to, greater than, or smaller than a first set value. For example, the first set value may be 1.

When the ratio of the difference between the inlet and outlet temperatures of the first evaporator 150 to the difference between the inlet and outlet temperatures of the second evaporator 160 is 1, for example, when the difference between the inlet and outlet temperatures of the first evaporator 150 is the same as the difference between the inlet and outlet temperatures of the second evaporator 160, it may be determined that the refrigerant is equally introduced into the first and second evaporators 150 and 160.

When the ratio of the difference between the inlet and outlet temperatures of the first evaporator 150 to the difference between the inlet and outlet temperatures of the second evaporator 160 is greater than 1, for example, when the difference between the inlet and outlet temperatures of the first evaporator 150 is greater than the difference between the inlet and outlet temperatures of the second evaporator 160, it may be determined that the refrigerant is unequally introduced into the second evaporator 160.

When the ratio of the difference between the inlet and outlet temperatures of the first evaporator 150 to the difference between the inlet and outlet temperatures of the second evaporator 160 is smaller than 1, for example, when the difference between the inlet and outlet temperatures of the first evaporator 150 is smaller than the difference between the inlet and outlet temperatures of the second evaporator 160, it may be determined that the refrigerant is unequally introduced into the first evaporator 150.

For another example of the determination in operation in step S39, whether the refrigerant is unequally introduced may be determined according to whether the difference value between the difference between the inlet and outlet temperatures of the first evaporator 150 and the difference between the inlet and outlet temperatures of the second evaporator 160 is equal to, greater than, or smaller than a second set value. For example, the second set value may be 0.

When a value obtained by subtracting the difference between the inlet and outlet temperatures of the second evaporator 160 from the difference between the inlet and outlet temperatures of the first evaporator 150 is 0, for example, when the difference between the inlet and outlet temperatures of the first evaporator 150 is the same as the difference between the inlet and outlet temperatures of the second evaporator 160, it may be determined that the refrigerant is equally introduced into the first and second evaporators 150 and 160.

When the value obtained by subtracting the difference between the inlet and outlet temperatures of the second evaporator 160 from the difference between the inlet and outlet temperatures of the first evaporator 150 is greater than 0, for example, when the difference between the inlet and outlet temperatures of the first evaporator 150 is greater than the difference between the inlet and outlet temperatures of the second evaporator 160, it may be determined that the refrigerant is unequally introduced into the second evaporator 160.

When the value obtained by subtracting the difference between the inlet and outlet temperatures of the second evaporator 160 from the difference between the inlet and outlet temperatures of the first evaporator 150 is smaller than 0, for example, when the difference between the inlet and outlet temperatures of the first evaporator 150 is smaller than the difference between the inlet and outlet temperatures of the second evaporator 160, it may be determined that the refrigerant is unequally introduced into the first evaporator 150.

Figure 9:
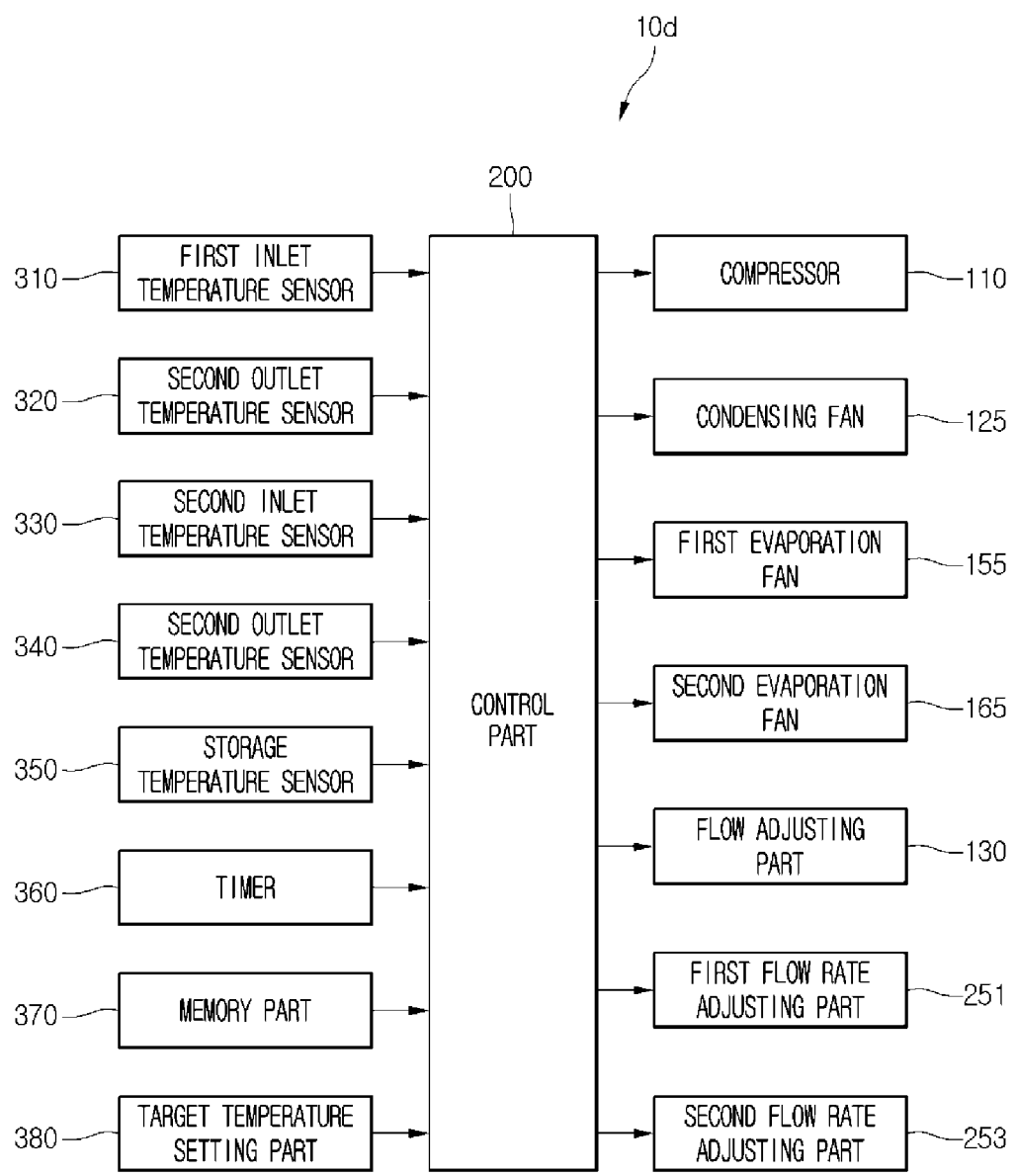
FIG. 9 is a block diagram illustrating a configuration of a refrigerator according to another embodiment.

FIG. 9 is a block diagram illustrating a configuration of a refrigerator according to another embodiment. Components of the refrigerator as illustrated in FIG. 9 may be formed by adding components to cycle components of the refrigerator of FIG. 5.

Referring to FIG. 9, a refrigerator 10*d* according to the current embodiment may include a refrigerant pipe arrangement 100 for guiding a flow of refrigerant condensed at a condenser 120, a flow adjusting part 130 installed on the refrigerant pipe arrangement 100 and dividing the refrigerant into flows to first and second evaporators 150 and 160, and a plurality of refrigerant passages 201 and 203 extending from an outlet side of the flow adjusting part 130 to the first and second evaporators 150 and 160. The description with reference to FIG. 5 may be applied to these elements included in the refrigerator 10*d*.

Further, the refrigerator 10*d* may include a plurality of temperature sensors 310, 320, 330, and 340 for sensing inlet and outlet temperatures of the first and second evaporators 150 and 160, a storage temperature sensor 350, a timer 360, a memory part 370, and a target temperature setting part 380. The description with reference to FIG. 7 may be applied to these elements included in the refrigerator 10*d*.

The description of the method as illustrated in FIG. 8 may be applied to a method of controlling a refrigerator according to the current embodiment. However, the current embodiment and the previous embodiment are different in control state of the first and second flow rate adjusting parts 251 and 253 according to cases 1 and 2.

In particular, when the first and second flow rate adjusting parts 251 and 253 are controlled such that an amount of the refrigerant flowing through the first refrigerant passage 201 is greater than an amount of the refrigerant flowing through the second refrigerant passage 203, the time controls according to case 1 as illustrated in table 2 may be used. For example, the degree of the opening of the first flow rate adjusting part 251 may be controlled to be greater than the degree of the opening of the second flow rate adjusting part 253.

When the first and second flow rate adjusting parts 251 and 253 are controlled such that the amount of the refrigerant flowing through the second refrigerant passage 203 is greater than the amount of the refrigerant flowing through the first refrigerant passage 201, the time controls according to case 2 as illustrated in table 2 may be used. For example, the degree of the opening of the second flow rate adjusting part 253 may be controlled to be greater than the degree of the opening of the first flow rate adjusting part 251.

As such, since the flow adjusting part 130 and the degrees of the opening of the first and second flow rate adjusting parts 251 and 253 are controlled to adjust the amounts of the refrigerant passing through the first and second refrigerant passages 201 and 203, the refrigerant may be prevented from being unequally introduced into the first or second evaporator 150 or 160, thus improving cooling efficiency and decreasing power consumption.

As broadly described and embodied herein, the refrigerator may have various advantages. According to the embodiments, a plurality of evaporators may be simultaneously operated, and thus, a plurality of storages can be effectively cooled. In particular, a plurality of refrigerant passages may be provided at an inlet side of at least one of the evaporators, and the refrigerant passages may be provided with expansion devices, respectively, to control flows of refrigerant.

In addition, while a refrigerator is operated, amounts of the refrigerant supplied to the evaporators may be adjusted based on time values predetermined according to inner and outer temperature conditions of the refrigerator, thus effectively distributing the refrigerant to the evaporators.

As a result, a first control process in which an amount of the refrigerant supplied to one of the evaporators is increased, and a second control process in which amounts of the refrigerant supplied to the other evaporators are increased, may be performed according to set time periods, thus preventing the refrigerant from being unequally introduced into one of the evaporators.

A method of controlling an operation of a flow adjusting part according to a time period without using a separate control part may prevent unequal introduction of the refrigerant, thus saving costs.

In addition, while the refrigerator is operated, amounts of the refrigerant supplied to the evaporators may be adjusted based on a predetermined time value and differences between inlet and outlet temperatures of the evaporators, thus effectively distributing the refrigerant to the evaporators.

As a result, the first control process in which an amount of the refrigerant supplied to one of the evaporators is increased, and the second control process in which amounts of the refrigerant supplied to the other evaporators are increased, may be basically performed according to time periods set during a simultaneous cooling operation.

In addition, since a control time value of the first and second control processes may be changed based on inlet and outlet temperature information of first and second evaporators, an accurate control can be performed to prevent the refrigerant from being unequally introduced into a specific one of the evaporators.

In addition, flow rate adjusting parts may be provided on the refrigerant passages to adjust degrees of opening thereof, thereby accurately controlling flow rates of the refrigerant.

In addition, when a plurality of compressors, for example, a high pressure compressor and a low pressure compressor are provided in the refrigerator, an inlet side refrigerant flow resistance of a high pressure evaporator may be smaller than that of a low pressure evaporator, thus preventing an unequal introduction of the refrigerant to the low pressure evaporator caused by a pressure difference of the refrigerant.

Embodiments provide a refrigerator and a method of controlling the refrigerator, which efficiently cool a plurality of storages.

In one embodiment, a method of controlling a refrigerator includes: driving a refrigerating cycle including a first evaporator and a second evaporator by activating a compressor; simultaneously supplying cold air to a refrigerator compartment and a freezer compartment by supplying refrigerant to the first and second evaporators according to the driving of the refrigerating cycle; preventing the refrigerant from being unequally introduced into the second evaporator by increasing, for a first set time, a flow rate of the refrigerant supplied to the first evaporator; and preventing the refrigerant from being unequally introduced into the first evaporator by increasing, for a second set time, a flow rate of the refrigerant supplied to the second evaporator.

The preventing of the refrigerant from being unequally introduced into the first evaporator, and the preventing of the refrigerant from being unequally introduced into the second evaporator may be repeated until a temperature of the refrigerator compartment or the freezer compartment reaches a target temperature.

When the temperature of the refrigerator compartment or the freezer compartment reaches the target temperature, the refrigerant may be prevented from being supplied to at least one of the first and second evaporators, or an operation of the compressor may be stopped.

The first set time and the second set time may be mapped onto values that are different according to both an outer temperature condition of the refrigerator and state information of the refrigerator compartment and the freezer compartment.

The state information of the refrigerator compartment and the freezer compartment may include at least one of information about a cooling activation state in which the activation of the compressor starts; information about a load reaction state in which a temperature of the refrigerator compartment or the freezer compartment increases to be equal to or higher than a set temperature; and information about a state in which the refrigerator compartment and the freezer compartment are simultaneously cooled.

The first or second set time may be changed according to a change of the outer temperature condition of the refrigerator or the state information of the refrigerator compartment and the freezer compartment, and the flow rate of the refrigerant may be adjusted according to the changed first or second set time.

The method may further include determining whether one of the first and second set times is changed, based on information about a difference between an inlet temperature and an outlet temperature of the first evaporator or a difference between an inlet temperature and an outlet temperature of the second evaporator.

The determining of whether one of the first and second set times is changed may include recognizing whether the refrigerant is unequally introduced into the first or second evaporator, and whether the refrigerant is unequally introduced into the first or second evaporator may be determined according to whether at least one of the information about the difference between the inlet and outlet temperatures of the first evaporator, and the information about the difference between the inlet and outlet temperatures of the second evaporator is included within a set range.

Whether the refrigerant is unequally introduced into the first or second evaporator may be determined based on one of the difference between the inlet and outlet temperatures of the first evaporator, a difference value between the difference between the inlet and outlet temperatures of the first evaporator and the difference between the inlet and outlet temperatures of the second evaporator, and a ratio value between the difference between the inlet and outlet temperatures of the first evaporator and the difference between the inlet and outlet temperatures of the second evaporator.

The determining of whether one of the first and second set times is changed may include fixing the first set time and increasing or decreasing the second set time when the refrigerant is unequally introduced into the first or second evaporator.

A cooling load of a storage on which the first evaporator is disposed may be greater than a cooling load of a storage on which the second evaporator is disposed.

The method may further include changing the flow rates of the refrigerant supplied to the first and second evaporators, according to a change of the first or second set time, when whether one of the first and second set times is changed is determined.

In another embodiment, a refrigerator includes: a compressor that compresses refrigerant to drive a refrigerating cycle for supplying cold air to a refrigerator compartment and a freezer compartment; a condenser that condenses the refrigerant compressed at the compressor; a refrigerant pipe arrangement that guides a flow of the refrigerant condensed at the condenser; a plurality of refrigerant passages that diverge from the refrigerant pipe arrangement and are provided with expansion devices; first and second evaporators for evaporating the refrigerant passed through the refrigerant passages; a storage temperature sensor that senses an inner temperature of the refrigerator compartment or the freezer compartment; an outer temperature sensor that senses an outer temperature of the refrigerator compartment and the freezer compartment; a flow adjusting part that adjusts amounts of the refrigerant flowing through the refrigerant passages; a memory part in which information about control times of the flow adjusting part is mapped onto information sensed at the storage temperature sensor and the outer temperature sensor and is stored; and a control part that controls the flow adjusting part to simultaneously supply the refrigerant to the first and second evaporators, based on the mapped information stored in the memory part.

The information about the control times of the flow adjusting part may include: information about a first set time of increasing an amount of the refrigerant supplied to the first evaporator to prevent the refrigerant from being unequally introduced into the second evaporator; and information about a second set time of increasing an amount of the refrigerant supplied to the second evaporator to prevent the refrigerant from being unequally introduced into the first evaporator.

The control part may maintain a first adjustment state of the flow adjusting part for the first set time, and then, maintain a second adjustment state of the flow adjusting part for the second set time, and repeatedly control the first and second adjustment states of the flow adjusting part until a temperature of the refrigerator compartment or the freezer compartment reaches a target temperature.

The refrigerator may further include a temperature sensor that senses inlet and outlet temperatures of the first evaporator or inlet and outlet temperatures of the second evaporator, wherein the control part determines whether to change a first or second set time, based on information sensed at the temperature sensor.

According to the information sensed at the temperature sensor, the control part may increase the second set time when recognizing that the refrigerant is unequally introduced into the first evaporator, and decrease the second set time when recognizing that the refrigerant is unequally introduced into the second evaporator.

The refrigerant passages may include: a first refrigerant passage provided with a first expansion device and connected to the first evaporator; a second refrigerant passage provided with a second expansion device and connected to the second evaporator; and a third refrigerant passage provided with a third expansion device and connected to the first evaporator.

The refrigerant passages may include: a first refrigerant passage provided with a first expansion device and connected to the first evaporator; a second refrigerant passage provided with a second expansion device and connected to the second evaporator; a third refrigerant passage provided with a third expansion device and connected to the first evaporator; and a fourth refrigerant passage provided with a fourth expansion device and connected to the second evaporator.

The refrigerant passages may include: a first refrigerant passage provided with a first expansion device and connected to the first evaporator; and a second refrigerant passage provided with a second expansion device and connected to the second evaporator, and the refrigerator may include: a first flow rate adjusting part provided on the first refrigerant passage to adjust a refrigerant amount; and a second flow rate adjusting part provided on the second refrigerant passage to adjust a refrigerant amount.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a refrigerator, comprising:
    driving a refrigerating cycle that includes a first evaporator and a second evaporator by activating a compressor;
    simultaneously supplying cold air to a refrigerator compartment and a freezer compartment by supplying refrigerant to the first and second evaporators according to the driving of the refrigerating cycle;
    preventing the refrigerant from being introduced into the second evaporator by more than a first prescribed amount of refrigerant by increasing, for a first prescribed amount of time, a flow rate of the refrigerant supplied to the first evaporator,
    preventing the refrigerant from being introduced into the first evaporator by more than a second prescribed amount of refrigerant by increasing, for a second prescribed amount of time, a flow rate of the refrigerant supplied to the second evaporator; and
    determining whether to change at least one of the first prescribed amount of time or the second prescribed amount of time based on information about a difference between an inlet temperature and an outlet temperature of the first evaporator or a difference between an inlet temperature and an outlet temperature of the second evaporator,
    wherein the refrigerator further comprises:
        first and third refrigerant passages disposed at an inlet of the first evaporator, the first and third refrigerant passages being configured to guide introduction of the refrigerant into the first evaporator and in which first and third expansion devices are installed, respectively; and
        a second refrigerant passage disposed at an inlet of the second evaporator, the second refrigerant passage being configured to guide introduction of the refrigerant into the second evaporator and in which a second expansion device is installed,
        the preventing the refrigerant from being introduced into the second evaporator by more than a first prescribed amount of refrigerant comprises that the first, second and third refrigerant passages are opened for the first prescribed amount of time,
        the preventing the refrigerant from being introduced into the first evaporator by more than a second prescribed amount of refrigerant comprises that the first and the second refrigerant passages are opened and the third refrigerant passage is closed for the second prescribed amount of time, and
        the determining whether to change at least one of the first prescribed amount of time or the second prescribed amount of times includes maintaining the first prescribed amount of time and increasing or decreasing the second prescribed amount of time when the refrigerant is unequally introduced into the first or second evaporator.

2. The method according to claim 1, wherein the preventing the refrigerant from being introduced into the first evaporator by more than the first prescribed amount of refrigerant includes preventing a greater amount of refrigerant from being introduced into the first evaporator than the second evaporator, and the preventing the refrigerant from being introduced into the second evaporator by more than a second prescribed amount of refrigerant includes preventing a greater amount of refrigerant from being introduced into the second evaporator than the first evaporator, and wherein the preventing a greater amount of refrigerant from being introduced into the first evaporator and the preventing a greater amount of refrigerant from being introduced into the second evaporator are repeated until a temperature of the refrigerator compartment or the freezer compartment reaches a target temperature.

3. The method according to claim 2, wherein when the temperature of the refrigerator compartment or the freezer compartment reaches the target temperature, the refrigerant is prevented from being supplied to at least one of the first and second evaporators, or the compressor is stopped.

4. The method according to claim 1, wherein the first prescribed amount of time and the second prescribed amount of time are mapped to different values based on an outer temperature of the refrigerator and state information of the refrigerator compartment and the freezer compartment.

5. The method according to claim 4, wherein the state information of the refrigerator compartment and the freezer compartment includes at least one of information about a cooling activation state in which the activation of the compressor starts, information about a load reaction state in which a temperature of the refrigerator compartment or the freezer compartment increases to be equal to or higher than a prescribed temperature, or information about a state in which the refrigerator compartment and the freezer compartment are simultaneously cooled.

6. The method according to claim 5, wherein the first or second prescribed amount of time is changed according to a change in the outer temperature of the refrigerator or the state information of the refrigerator compartment and the freezer compartment, and the flow rate of the refrigerant is adjusted according to the changed first or second prescribed amount of time.

7. The method according to claim 1, wherein the determining whether to change the at least one of the first prescribed amount of time or the second prescribed amount of time includes recognizing whether the refrigerant is unequally introduced into the first or second evaporator, and whether the refrigerant is unequally introduced into the first or second evaporator is determined according to whether at least one of the difference between the inlet and outlet temperatures of the first evaporator or the difference between the inlet and outlet temperatures of the second evaporator is within a prescribed range.

8. The method according to claim 7, wherein whether the refrigerant is unequally introduced into the first or second evaporator is determined based on at least one of the difference between the inlet and outlet temperatures of the first evaporator, a difference between the difference between the inlet and outlet temperatures of the first evaporator and the difference between the inlet and outlet temperatures of the second evaporator, or a ratio between the difference between the inlet and outlet temperatures of the first evaporator and the difference between the inlet and outlet temperatures of the second evaporator.

9. The method according to claim 1, wherein a cooling load of a storage compartment corresponding to the first evaporator is greater than a cooling load of a storage compartment corresponding to the second evaporator.

10. The method according to claim 1, further comprising changing the flow rates of the refrigerant supplied to the first and second evaporators, according to a change in the first prescribed amount of time or second prescribed amount of time, when determining whether to change the at least one of the first prescribed amount of time or the second prescribed amount of time.

* * * * *